United States Patent
Akahira et al.

[19]

[11] Patent Number: 6,145,981
[45] Date of Patent: *Nov. 14, 2000

[54] COLOR FILTER MANUFACTURING METHOD AND APPARATUS, COLOR FILTER, COLOR FILTER SUBSTRATE, DISPLAY DEVICE, AND APPARATUS HAVING DISPLAY DEVICE

[75] Inventors: Makoto Akahira, Kawasaki; Hisanori Tsuda, Atsugi; Hiroshi Sato, Yokohama; Shinsuke Tsuruoka, Kawasaki; Yoshihiro Shigemura, Yokohama; Hiromitsu Yamaguchi, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/677,067

[22] Filed: Jul. 9, 1996

[30] Foreign Application Priority Data

Jul. 14, 1995 [JP] Japan .................................. 7-178972
Jul. 31, 1995 [JP] Japan .................................. 7-195237
Jun. 27, 1996 [JP] Japan .................................. 8-167751

[51] Int. Cl.[7] .................................................. B41J 2/01
[52] U.S. Cl. .......................... 347/107; 347/19; 347/23; 427/140; 427/162
[58] Field of Search .............................. 347/107, 19, 14, 347/23, 9, 16, 106; 427/140, 162, 256, 287

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 5,514,503 | 5/1996 | Evans et al. | 430/7 |
| 5,798,773 | 8/1998 | Hiramatsu et al. | 347/19 |

FOREIGN PATENT DOCUMENTS

| | | |
|---|---|---|
| 0583127 | 2/1994 | European Pat. Off. . |
| 0660159 | 6/1995 | European Pat. Off. . |
| 2689813 | 10/1993 | France . |
| 54-56847 | 5/1979 | Japan . |
| 58-143376 | 8/1983 | Japan . |
| 59-75205 | 4/1984 | Japan . |
| 59-1223670 | 7/1984 | Japan . |
| 59-138461 | 8/1984 | Japan . |
| 60-71260 | 4/1985 | Japan . |
| 61-251804 | 11/1986 | Japan . |
| 323340 | 12/1997 | Taiwan . |
| WO 95/21400 | 8/1995 | WIPO . |

*Primary Examiner*—John Barlow
*Assistant Examiner*—Juanita Stephens
*Attorney, Agent, or Firm*—Fitzpatrick, Cella, Harper & Scinto

[57] ABSTRACT

It is an object of the present invention to provide a color filter manufacturing method in which an abnormality in a head is quickly detected to reduce the quantity of defective products. In order to achieve this object, there is provided a color filter manufacturing method of coloring each pixel of a color filter by discharging an ink onto a substrate using an ink-jet head, thereby manufacturing a color filter, including performing detection of a discharge failure in the ink-jet head before coloring of at least a first pixel in an effective pixel portion serving as a color filter.

34 Claims, 29 Drawing Sheets

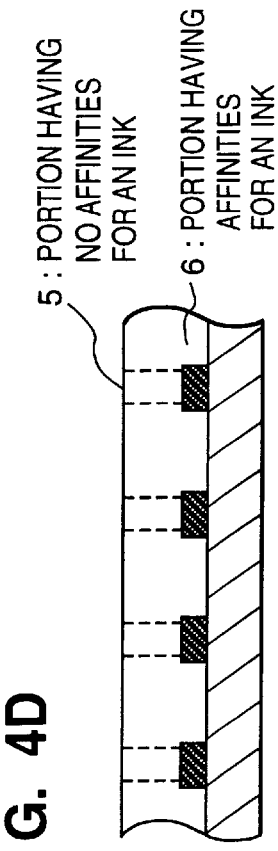
FIG. 4A
FIG. 4B
FIG. 4C
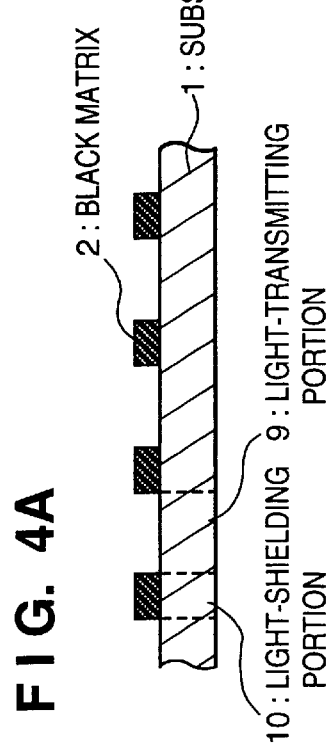
FIG. 4D
FIG. 4E
FIG. 4F
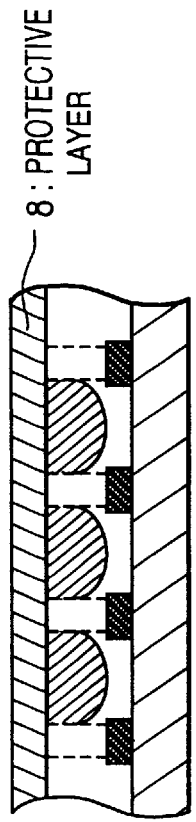
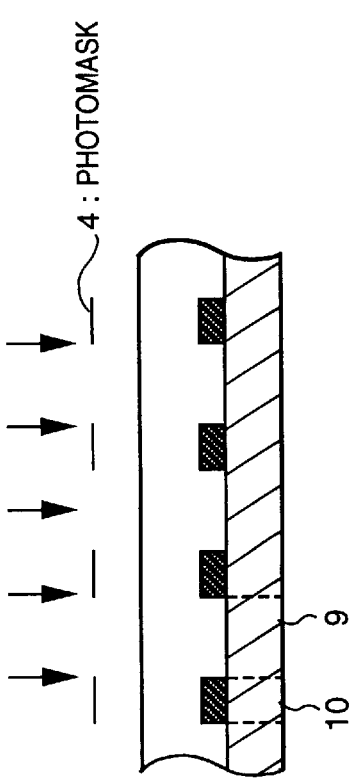

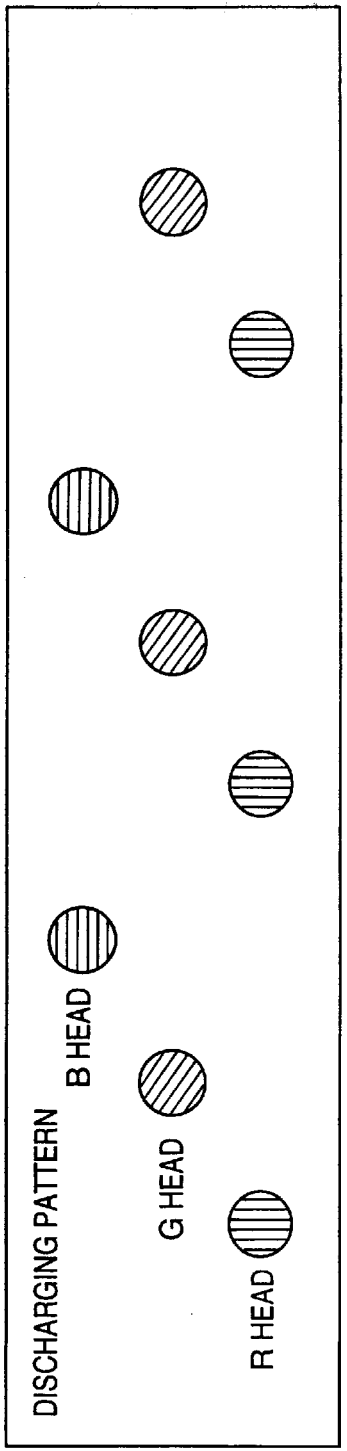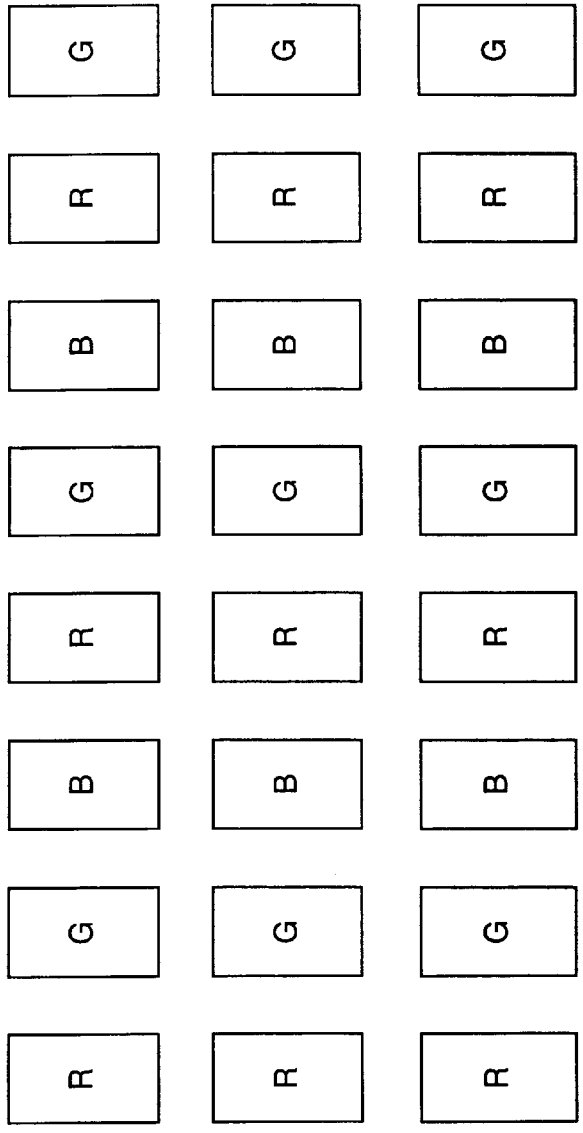
FIG. 12

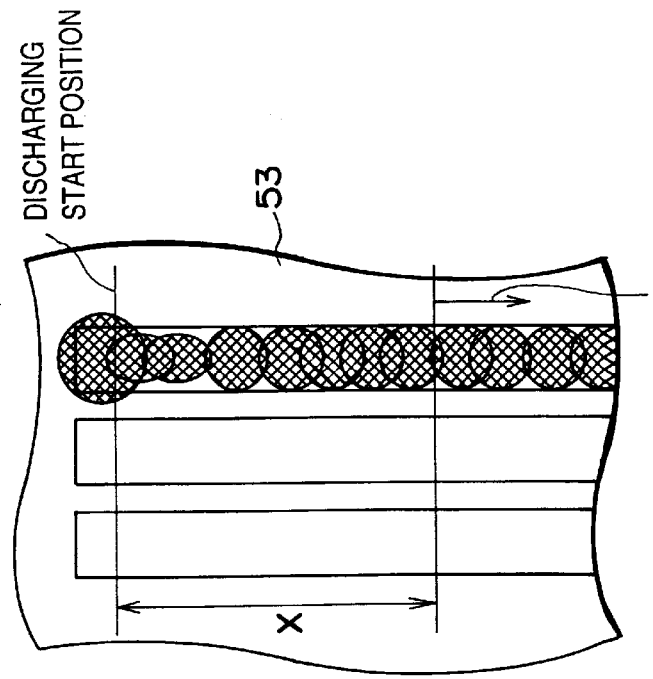
FIG. 15A — WHEN AMOUNT OF INK DISCHARGED FIRST IS SMALL
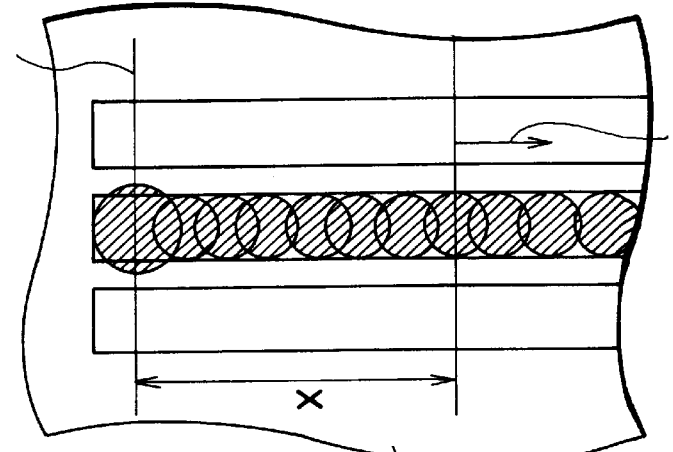
FIG. 15B — WHEN AMOUNT OF INK DISCHARGED FIRST IS LARGE
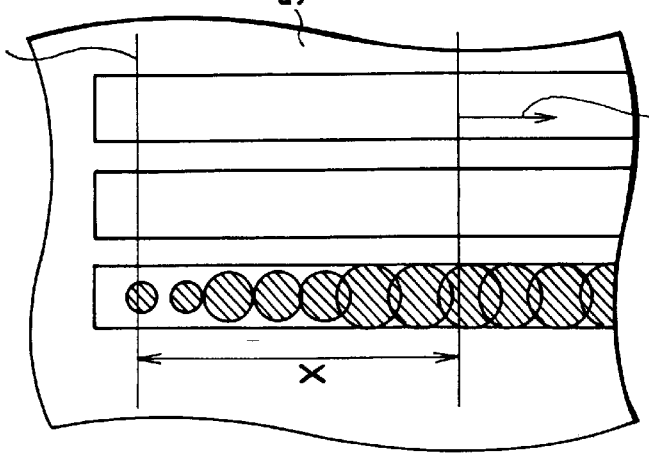
FIG. 15C — WHEN LANDING POINT OF INK IS OFFSET FROM CENTER OF GRAVITY OF INK DENSITY (INK IS ATTRACTED BY PREVIOUSLY DISCHARGED INK TO MOVE ON SURFACE OF INK-RECEIVING LAYER)

FIG. 22
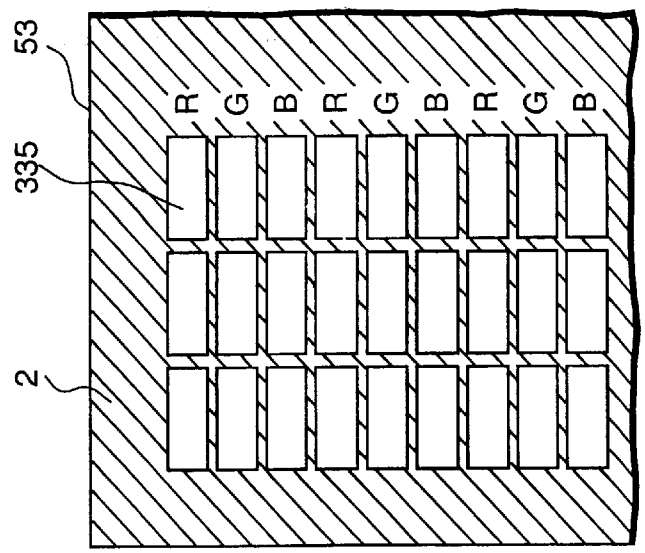
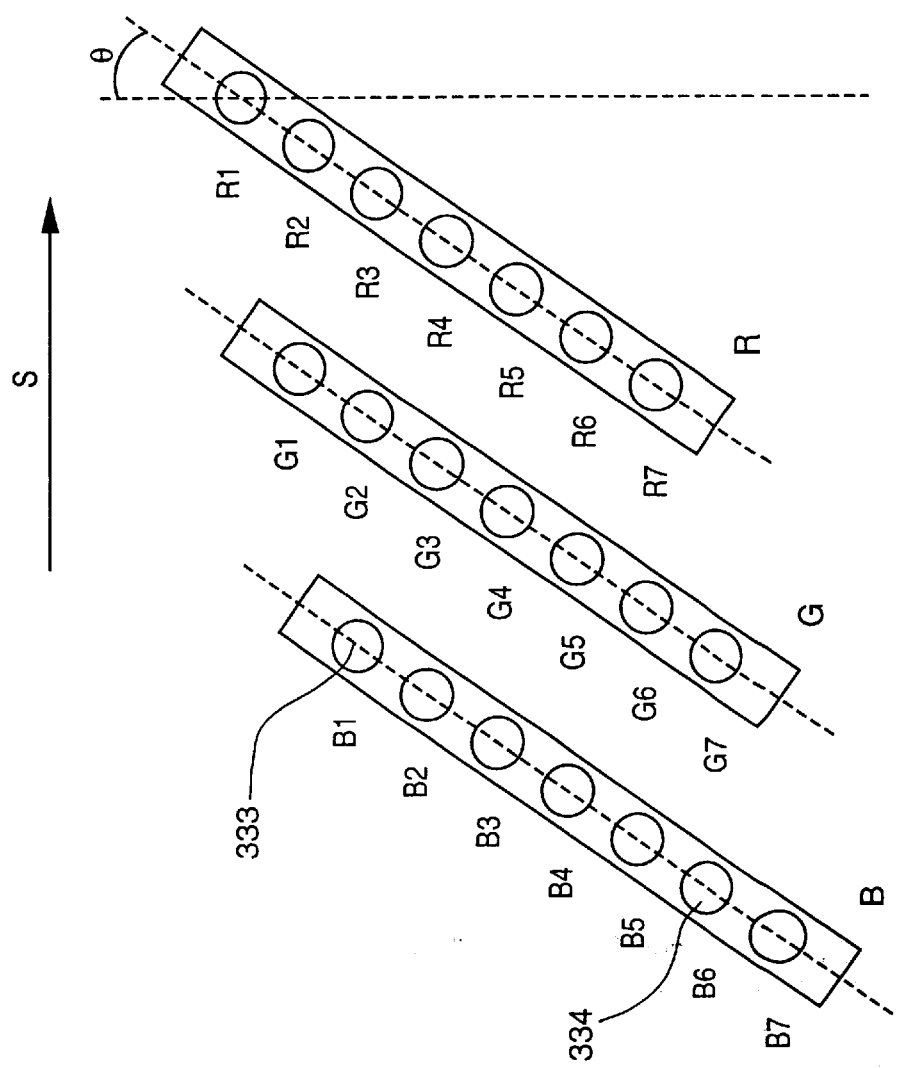

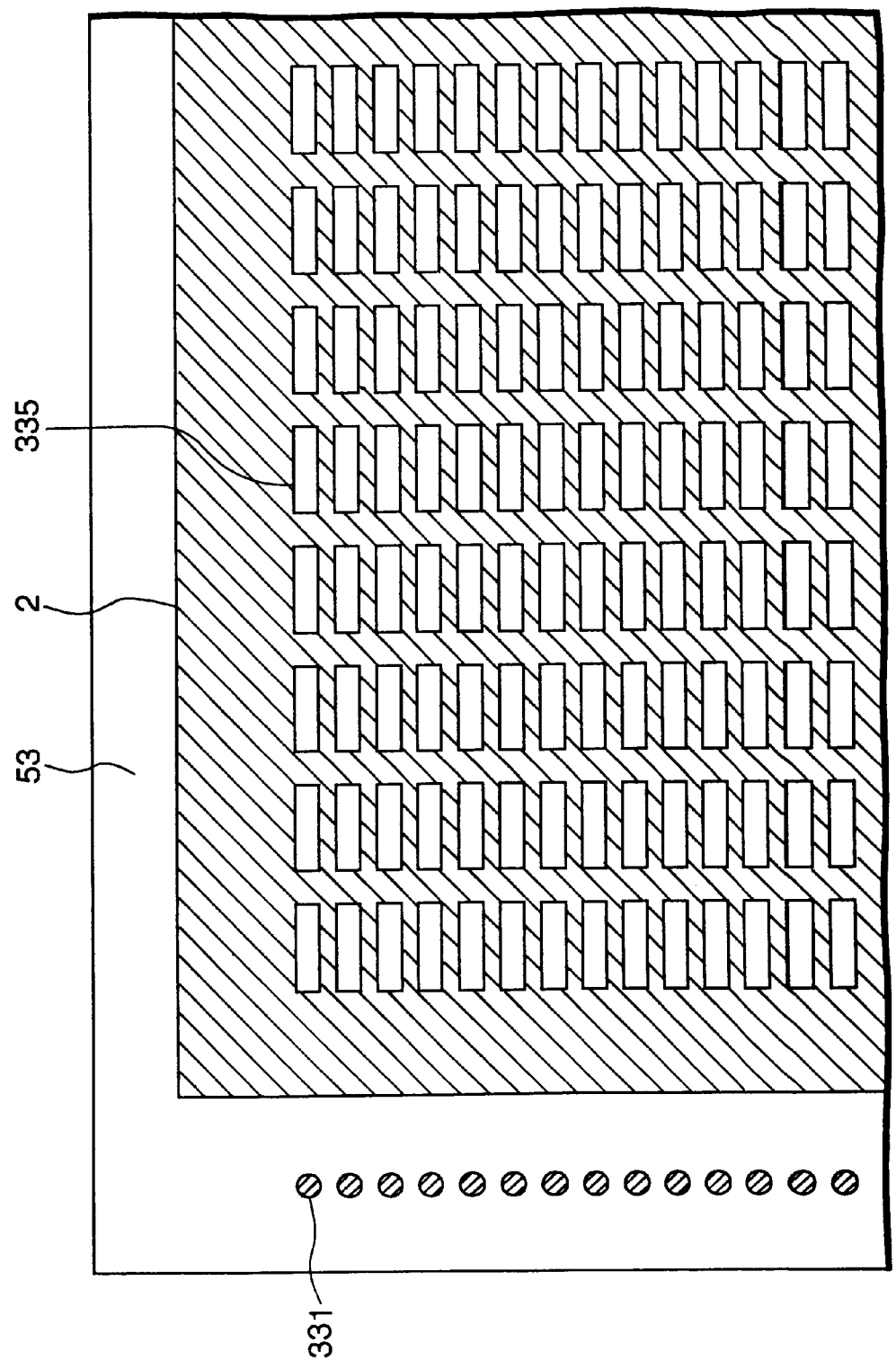

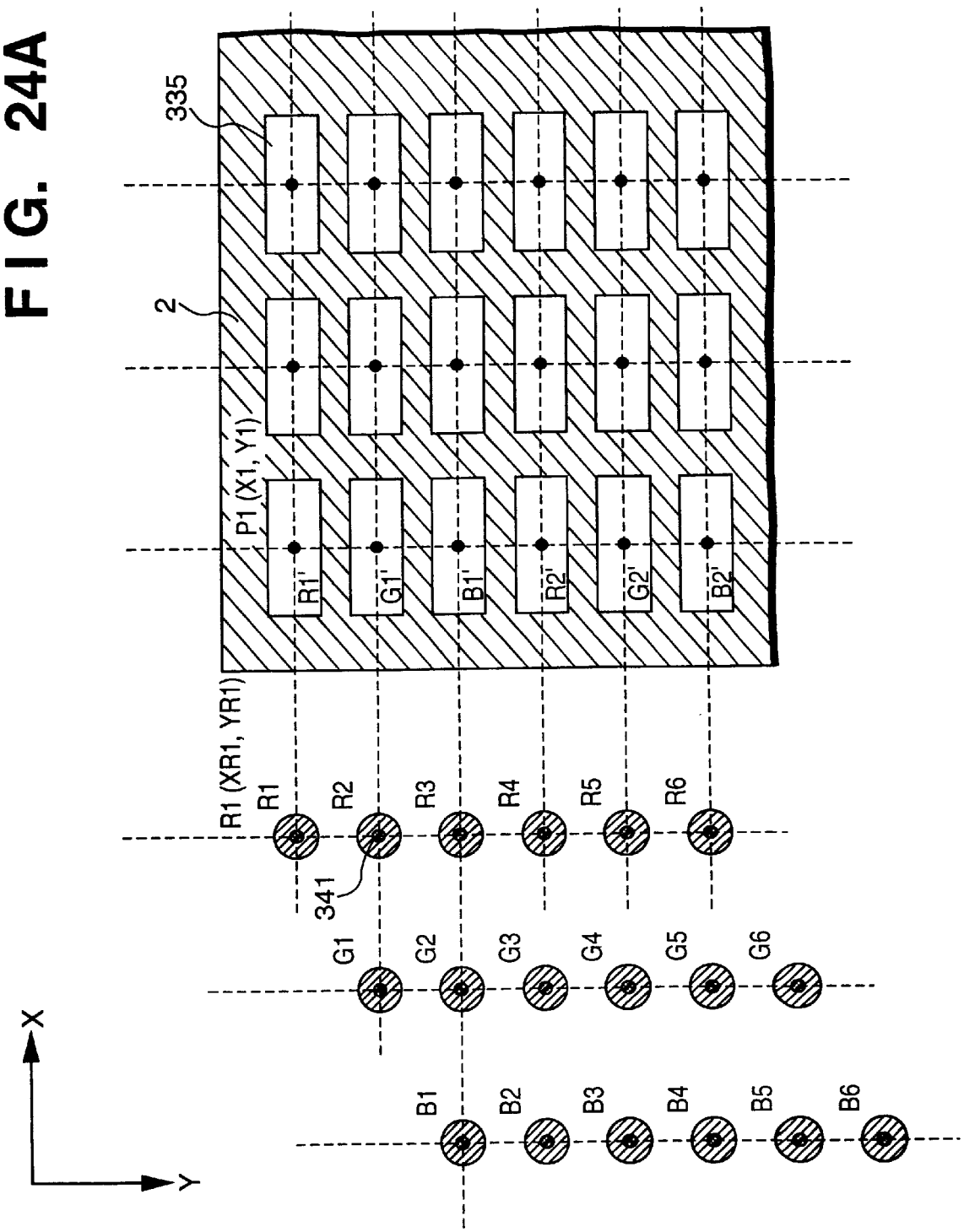

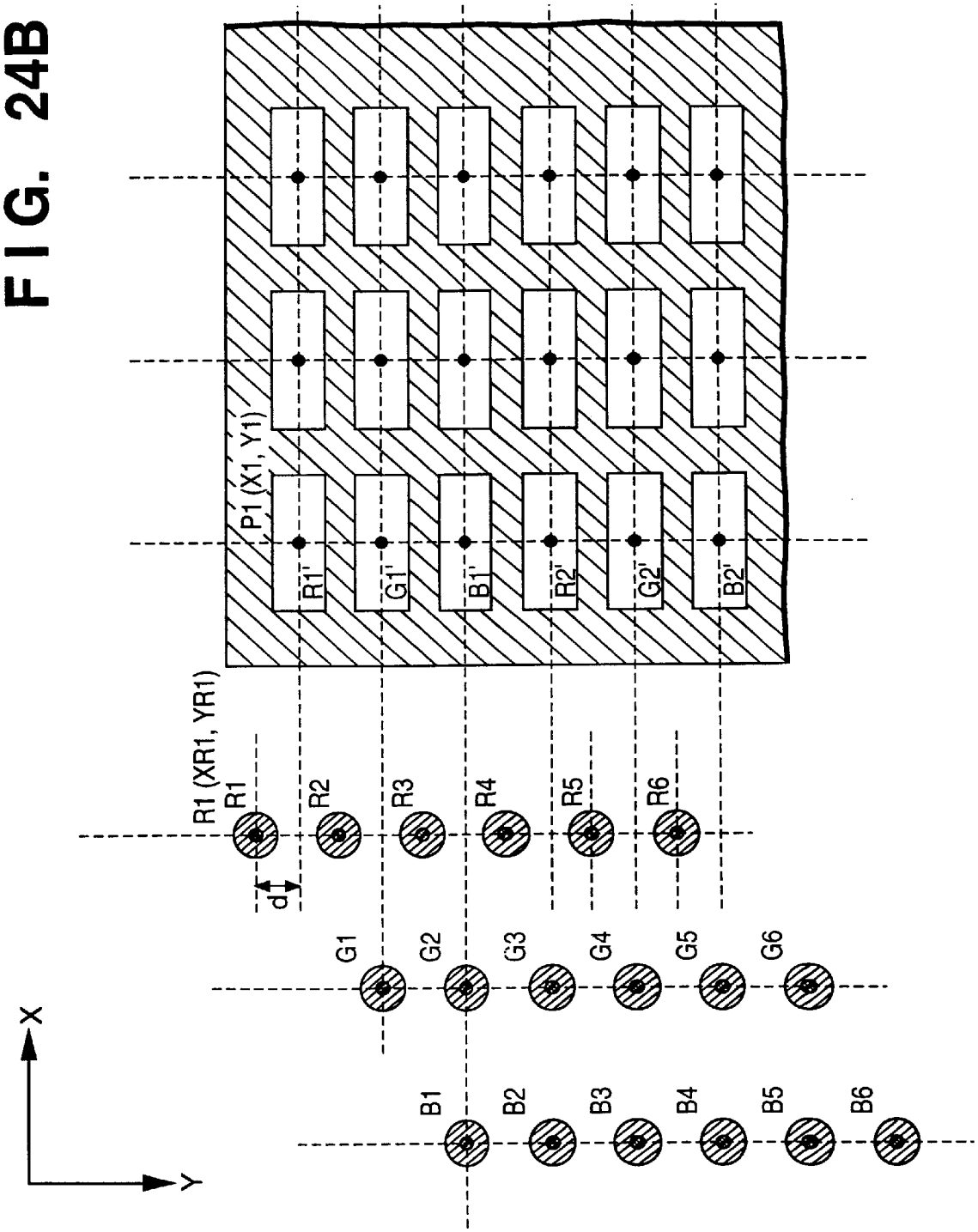

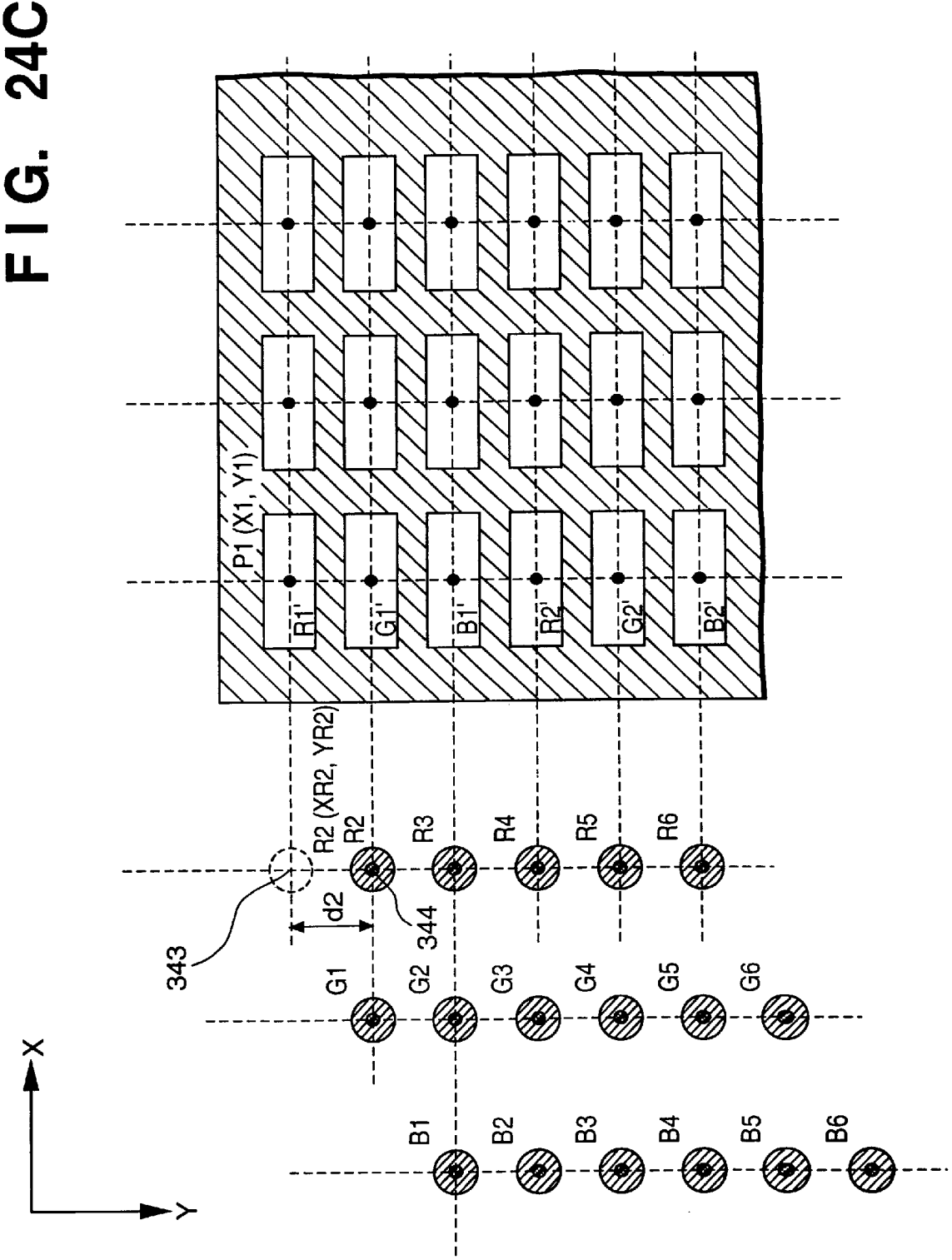

COLOR FILTER MANUFACTURING METHOD AND APPARATUS, COLOR FILTER, COLOR FILTER SUBSTRATE, DISPLAY DEVICE, AND APPARATUS HAVING DISPLAY DEVICE

BACKGROUND OF THE INVENTION

The present invention relates to a color filter manufacturing method and apparatus for manufacturing a color filter by discharging inks onto a substrate using ink-jet heads and coloring each pixel of the color filter, a color filter, a color filter substrate, a display device, and an apparatus having the display device.

In general, liquid crystal display devices are mounted in personal computers, wordprocessors, pinball machines, car navigation systems, compact TV sets, and the like. There have been great demands for liquid crystal display devices. However, liquid crystal display devices are expensive, and hence the demand for a reduction in cost has become increasingly higher.

A color filter as a component of a liquid crystal display device is formed by arranging pixels such as red (R), green (G), and blur (B) pixels on a transparent substrate. A black matrix for blocking light is arranged around each pixel to improve the display contrast.

The colored pixel portion of a color filter is formed by a dyeing method, a pigment dispersion method, an electrodeposition method, or the like.

In order to meet the demand for a reduction in the cost of a color filter, a method of forming pixels by a printing or ink-jet method has been proposed. In the printing method, however, since a colored pixel portion is formed by repeating a transfer (from a printing plate)/drying process three times for R, G, and B pixels, the yield decreases.

In the ink-jet method, as disclosed in, e.g., Japanese Patent Laid-Open No. 59-75205, coloring solutions containing coloring materials of three colors, i.e., R, G, and B, are sprayed on a transparent substrate by an ink-jet system, and the respective coloring solutions are dried to form colored image portions. In such an ink-jet system, R, G, and B pixels can be formed at once, allowing great simplification of the manufacturing process and a great reduction in cost.

In the ink-jet system, however, a head may become incapable of discharging an ink accidentally or because of scorching of an ink. In this case, the normal production process must be restored by, for example, quickly replacing or cleaning the head. In this case, all resultant defective substrates must be discarded, or part of the defective substrate must be discarded if the substrate is a multi-filter substrate.

Recently, for efficient production, larger substrates have been popular, e.g., 10-inch two-, four-, and six-filter substrates including 300 mm×200 mm, 360 mm×460 mm, and 550 mm×650 mm substrates. For this reason, even if head abnormality detection is performed before a coloring operation, when an abnormality such as an ink discharge failure occurs in the first filter, all the five remaining filters become defective products. The manufacture of such defective color filters causes a decrease in yield. Consequently, the cost merit in the ink-jet method is canceled out.

When a head is started to discharge an ink after a certain idle time, the amount of ink discharged is unstable immediately after the discharging operation, although the head may not become incapable of discharging the ink. If a high-resolution pattern for a color filter or the like is colored by using such a head, color mixing may be caused between adjacent pixels because of an excessively large amount of ink discharged, or a desired pixel may not be colored to cause a white omission because of an excessively small amount of ink discharged.

SUMMARY OF THE INVENTION

The present invention has been made in consideration of the above problems, and has as its first object to provide a color filter manufacturing method and apparatus which can quickly detect an abnormality in a head to reduce the quantity of defective products.

It is the second object of the present invention to provide a color filter manufacturing method and apparatus which can color each pixel while always stabilizing the discharging operation of an ink-jet head.

It is the third object of the present invention to provide a color filter manufactured by the above manufacturing method and apparatus, a color filter substrate, a display device, and an apparatus having the display device.

In order to solve the above problems and achieve the above objects, a color filter manufacturing method of the present invention is characterized by the following process according to its first aspect.

There is provided a color filter manufacturing method of coloring each pixel of a color filter by discharging an ink onto a substrate using an ink-jet head, thereby manufacturing a color filter, comprising performing detection of a discharge failure in the ink-jet head before coloring of at least a first pixel in an effective pixel portion serving as a color filter.

A color filter manufacturing method of the present invention is characterized by the following process according to its second aspect.

There is provided a color filter manufacturing method of coloring each pixel of a color filter by discharging an ink onto a substrate using an ink-jet head, thereby manufacturing a color filter, comprising, in forming a plurality of color filters on one substrate, performing detection of a discharge failure in the ink-jet head before coloring of pixels in an effective pixel portion of each color filter.

A color filter manufacturing apparatus of the present invention is characterized by the following arrangement according to its first aspect.

There is provided a color filter manufacturing apparatus for coloring each pixel of a color filter by discharging an ink onto a substrate using an ink-jet head, thereby manufacturing a color filter, comprising an ink-jet head, a stage for moving the substrate relative to the ink-jet head, and detection means for, in forming a plurality of color filters on one substrate, detecting a discharge failure in the ink-jet head before coloring of pixels in an effective pixel portion of each color filter.

A color filter of the present invention is characterized by the following arrangement according to its first aspect.

There is provided a color filter manufactured by discharging an ink onto a substrate using an ink-jet head to color each pixel of a color filter, comprising an effective pixel area serving as a color filter, and a coloring area for detecting a discharge failure in the ink-jet head.

A color filter substrate of the present invention is characterized by the following arrangement according to its first aspect.

There is provided a color filter substrate manufactured by discharging an ink onto a substrate using an ink-jet head to color each pixel of a color filter, comprising a coloring area for detecting a discharge failure in the ink-jet head between effective pixel portions of a plurality of color filters formed on one substrate.

A display device of the present invention is characterized by the following arrangement according to its first aspect.

There is provided a display device including a color filter manufactured by discharging an ink onto a substrate using an ink-jet head to color each pixel of a color filter, integrally comprising a color filter having an effective pixel area serving as a color filter, and a coloring area for detecting a discharge failure in the ink-jet head, and light amount changing means for changing a light amount.

An apparatus including a display device of the present invention is characterized by the following arrangement according to its first aspect.

There is provided an apparatus including a display device having a color filter manufactured by discharging an ink onto a substrate using an ink-jet head to color each pixel of a color filter, comprising a display device integrally including a color filter having an effective pixel area serving as a color filter, and a coloring area for detecting a discharge failure in the ink-jet head, and light amount changing means for changing a light amount, and image signal supply means for supplying an image signal to the display device.

A color filter manufacturing method of the present invention is characterized by the following process according to its third aspect.

There is provided a color filter manufacturing method of coloring each pixel of a color filter by discharging an ink onto a substrate using an ink-jet head, thereby manufacturing a color filter, comprising performing a pre-discharging operation of the ink-jet head with respect to the substrate before coloring of pixels in an effective pixel portion of the color filter.

A color filter manufacturing apparatus of the present invention is characterized by the following arrangement according to its second aspect.

There is provided a color filter manufacturing apparatus for coloring each pixel of a color filter by discharging an ink onto a substrate using an ink-jet head, thereby manufacturing a color filter, comprising an ink-jet head, a stage for moving the substrate relative to the ink-jet head, and control means for controlling the ink-jet head and the stage to perform a pre-discharging operation of the ink-jet head with respect to the substrate before coloring of pixels in an effective pixel portion of the color filter.

A color filter of the present invention is characterized by the following arrangement according to its second aspect.

There is provided a color filter manufactured by discharging an ink onto a substrate using an ink-jet head to color each pixel of a color filter, comprising an effective pixel area serving as a color filter, and a coloring area formed by a pre-discharging operation of the ink-jet head.

A display device of the present invention is characterized by the following arrangement according to its second aspect.

There is provided a display device including a color filter manufactured by discharging an ink onto a substrate using an ink-jet head to color each pixel of a color filter, integrally comprising a color filter having an effective pixel area serving as a color filter, and a coloring area formed by a pre-discharging operation of the ink-jet head, and light amount changing means for changing a light amount.

An apparatus including a display device of the present invention is characterized by the following arrangement according to its second aspect.

There is provided an apparatus including a display device having a color filter manufactured by discharging an ink onto a substrate using an ink-jet head to color each pixel of a color filter, comprising a display device integrally including a color filter having an effective pixel area serving as a color filter, and a coloring area formed by a pre-discharging operation of the ink-jet head, and light amount changing means for changing a light amount, and image signal supply means for supplying an image signal to the display device.

A color filter manufacturing method of the present invention is characterized by the following process according to its fourth aspect.

There is provided a color filter manufacturing method of coloring each pixel of a color filter by discharging an ink onto a substrate using an ink-jet head having a plurality of ink discharging nozzles, thereby manufacturing a color filter, comprising the pre-discharging step of pre-discharging the ink from the ink-jet head onto an area other than a pixel formation area of the color filter, the detection step of detecting the presence/absence of a coloring failure on the basis of a coloring result in the pre-discharging step, and the position adjustment step of adjusting a position of the ink-jet head to move each ink discharging nozzle to a position corresponding to each pixel when a coloring failure is detected in the detection step.

A color filter manufacturing apparatus of the present invention is characterized by the following arrangement according to its third aspect.

There is provided a color filter manufacturing apparatus for coloring each pixel of a color filter by discharging an ink onto a substrate using an ink-jet head, thereby manufacturing a color filter, comprising an ink-jet head having a plurality of ink discharging nozzles, detection means for detecting a coloring failure by detecting an ink dot formed by pre-discharging the ink from the ink-jet head onto an area other than a pixel formation area of the color filter, and position adjustment means for adjusting a position of the ink-jet head to move each ink discharging nozzle to a position corresponding to each pixel when a coloring failure is detected by the detection means.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 4A to 4F are sectional views showing a color filter manufacturing process;

FIG. 12 is a view showing a head abnormality detection pattern in manufacturing a color filter;

FIGS. 15A to 15C are views each showing how an ink discharged state becomes unstable in the initial period of the discharging operation of an ink-jet head;

FIG. 22 is a view showing the relationship between the discharging openings of a plurality of coloring heads and a glass substrate to be colored;

FIG. 23 is a view showing an example of coloring a glass substrate using the arrangement shown in FIG. 22;

FIG. 24A is a view for explaining the positional relationship between a BM pattern and dots pre-discharged onto a blank portion in detail;

FIG. 24B is a view for explaining the positional relationship between a BM pattern and dots pre-discharged onto a blank portion in detail;

FIG. 24C is a view for explaining the positional relationship between a BM pattern and dots pre-discharged onto a blank portion in detail.

DETAILED DESCRIPTION OF THE PREFERRED EMBODIMENTS

The preferred embodiments of the present invention will be described in detail below with reference to the accompanying drawings.

(First Embodiment)

Figure 1:
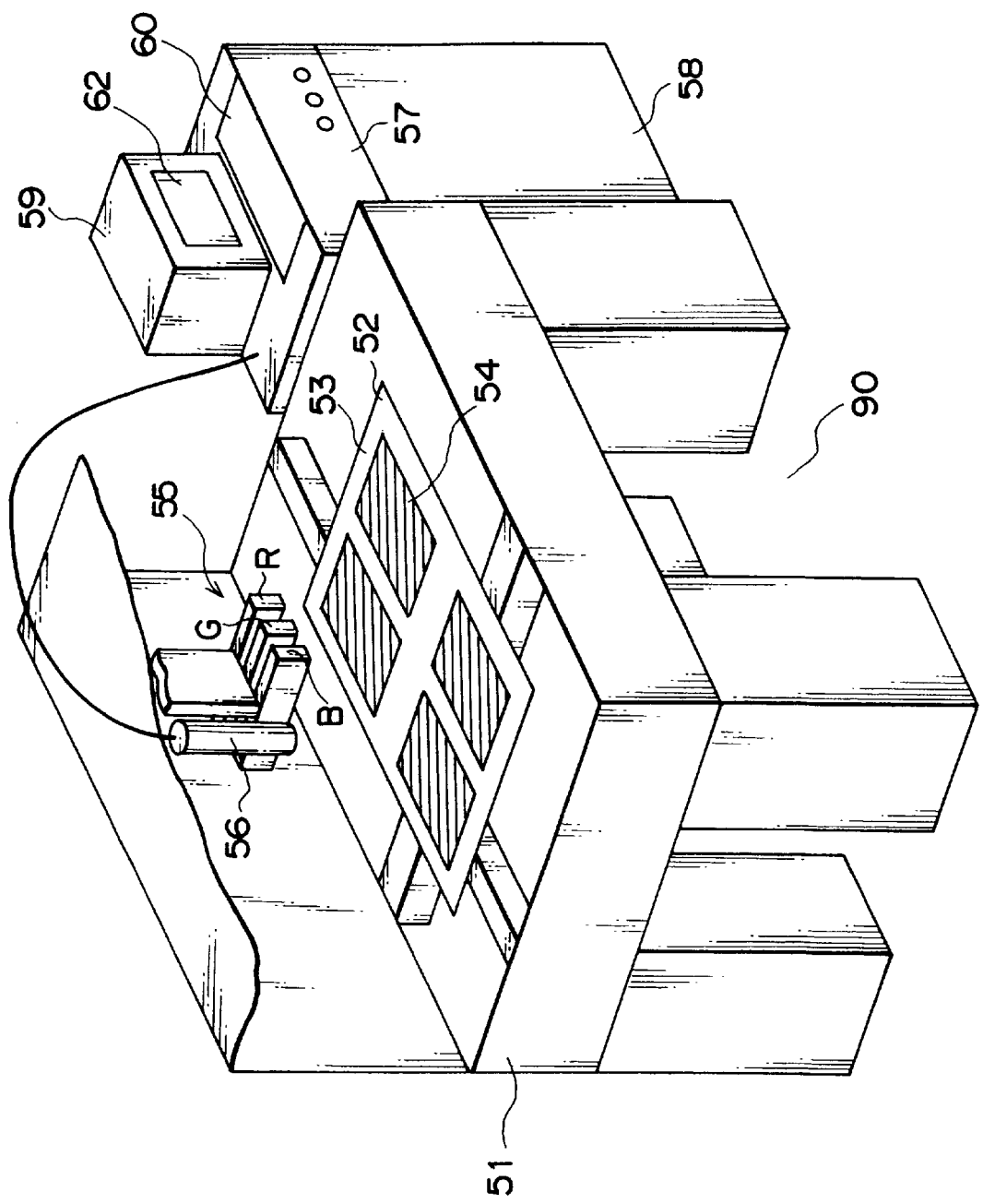
FIG. 1 is a perspective view showing the schematic arrangement of a color filter manufacturing apparatus according to the first embodiment of the present invention.

FIG. 1 is a schematic view showing the arrangement of a color filter manufacturing apparatus according to the first embodiment of the present invention.

Referring to FIG. 1, reference numeral 51 denotes an apparatus base; 52, an X-Y-θ stage disposed on the apparatus base 51; 53, a color filter substrate set on the X-Y-θ stage 52; 54, color filters formed on the color filter substrate 53; 55, R (red), G (green), and B (blue) ink-jet heads for coloring the color filters 54; 56, a TV camera incorporating a line sensor for detecting a discharge failure in each head; 57, an image processing apparatus for checking the presence/absence of a discharge failure by processing data picked up by the TV camera 56; 58, a controller for controlling the overall operation of a color filter manufacturing apparatus 90; 59, a teaching pendant (personal computer) as the display unit of the controller; and 60, a keyboard as the operation unit of the teaching pendant 59.

Figure 2:
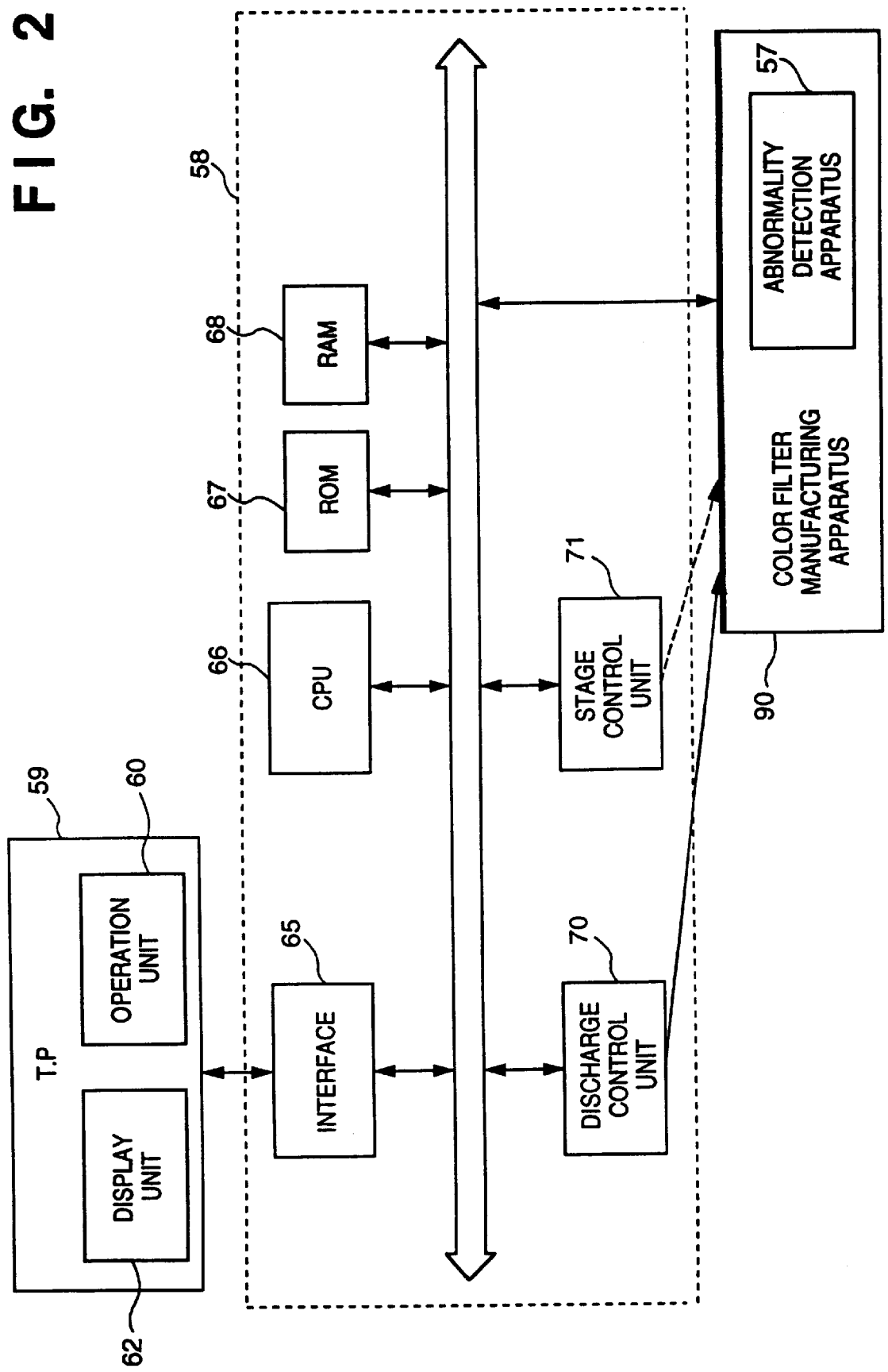
FIG. 2 is a block diagram showing the arrangement of a control unit for controlling the operation of the color filter manufacturing apparatus.

FIG. 2 is a block diagram showing the arrangement of the controller of the color filter manufacturing apparatus 90. The teaching pendant 59 serves as the input/output means of the controller 58. Reference numeral 62 denotes a display unit for displaying how a manufacturing process progresses, information indicating the presence/absence of a head abnormality, and the like. The keyboard 60 designates an operation of the color filter manufacturing apparatus 90 and the like.

The controller 58 controls the overall operation of the color filter manufacturing apparatus 90. Reference numeral 65 denotes an interface for exchanging data with the teaching pendant 59; 66, a CPU for controlling the color filter manufacturing apparatus 90; 67, a ROM storing control programs for operating the CPU 66; 68, a RAM for storing abnormality information and the like; 57, an abnormality detection apparatus (e.g., an image processing apparatus) for detecting a discharge failure in each ink-jet head 55; 70, a discharge control unit for controlling discharging of an ink into each pixel of a color filter; and 71, a stage control unit for controlling the operation of the X-Y-θ stage 52 of the color filter manufacturing apparatus 90. The color filter manufacturing apparatus 90 is connected to the controller 58 and operates in accordance with instructions therefrom.

Figure 3:
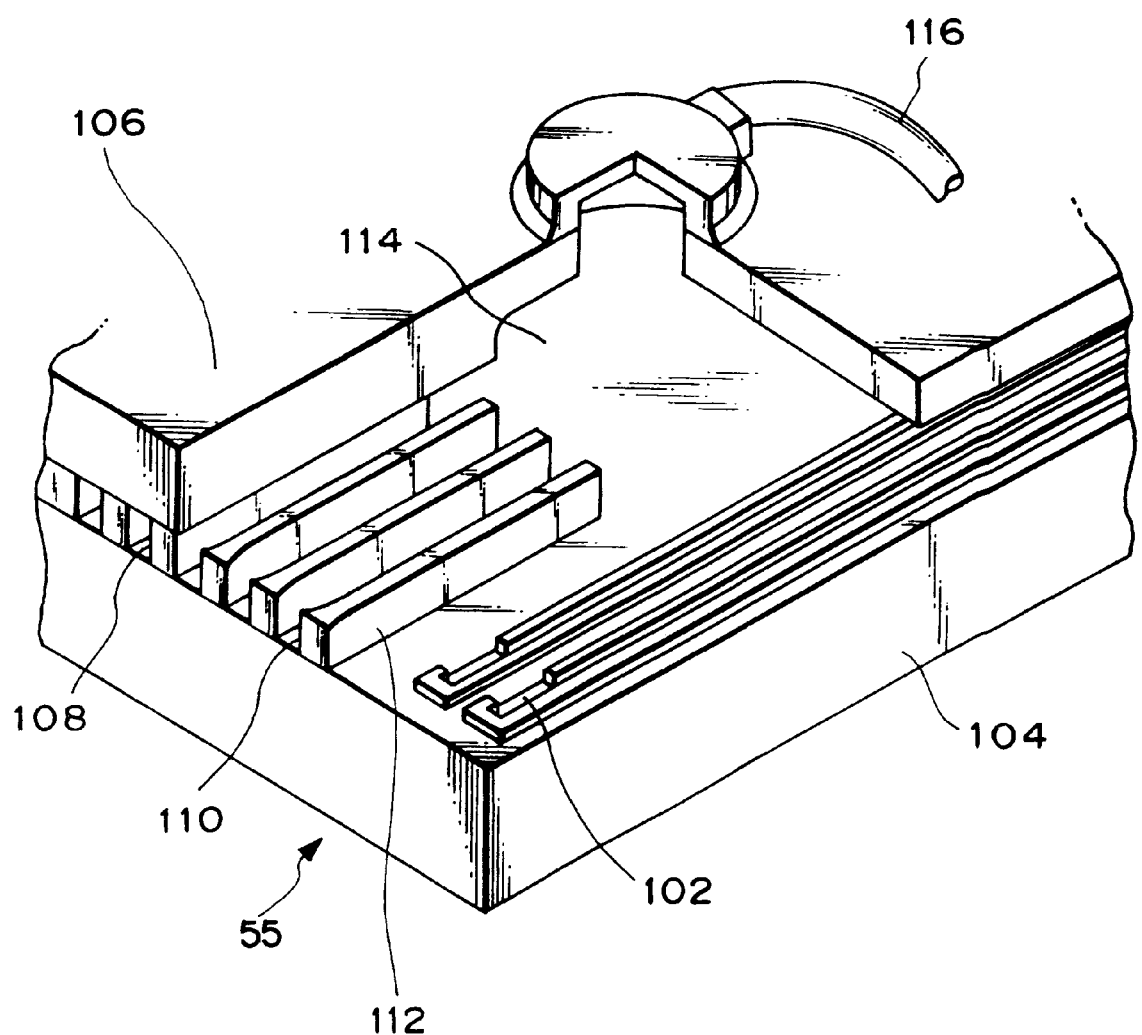
FIG. 3 is a perspective view showing the structure of an ink-jet head used in the color filter manufacturing apparatus.

FIG. 3 shows the structure of the ink-jet head 55 used in the color filter manufacturing apparatus 90. Referring to FIG. 1, three ink-jet heads are arranged in correspondence with three colors, i.e., R, G, and B. Since these three heads have the same structure, FIG. 3 shows the structure of one of the three heads as a representative.

Referring to FIG. 3, the ink-jet head 55 mainly comprises a heater board 104 as a board on which a plurality of heaters 102 for heating an ink are formed, and a ceiling plate 106 mounted on the heater board 104. A plurality of discharging openings 108 are formed in the ceiling plate 106. Tunnel-like fluid passages 110 communicating with the discharging openings 108 are formed therebehind. The respective fluid passages 110 are isolated from the adjacent fluid passages via partition walls 112. The respective fluid passages 110 are commonly connected to one ink chamber 114 at the rear side of the fluid passages. An ink is supplied to the ink chamber 114 via an ink inlet 116. This ink is supplied from the ink chamber 114 to each fluid passage 110.

The heater board 104 and the ceiling plate 106 are positioned such that the position of each heater 102 coincides with that of a corresponding fluid passage 110, and are assembled into the state shown in FIG. 3. Although FIG. 3 shows only two heaters 102, the heater 102 is arranged in correspondence with each fluid passage 110. When a predetermined driving signal is supplied to the heater 102 in the assembled state shown in FIG. 3, an ink above the heater 102 is boiled to produce a bubble, and the ink is pushed and discharged from the discharging opening 108 upon volume expansion of the ink. Therefore, the size of a bubble can be adjusted by controlling a driving pulse applied to the heater 102, e.g., controlling the magnitude of power. That is, the volume of the ink discharged from each discharging opening can be arbitrarily controlled.

FIGS. 4A to 4F show the process of manufacturing a color filter. The process of manufacturing a color filter 53 will be described next with reference to FIGS. 4A to 4F.

A light-transmitting substrate is preferably used as a substrate for a color filter of the present invention. In general, a glass substrate is used. However, a substrate other than a glass substrate can be used as long as it has characteristics required for a liquid crystal color filter, e.g., good transparency and high mechanical strength.

FIG. 4A shows a glass substrate 1 having a black matrix 2 for forming light-transmitting portions 9 and light-shielding portions 10. First of all, the glass substrate 1, on which the black matrix 2 is formed, is coated with a resin composition which has poor ink receptivity but exhibits an affinity for an ink under a certain condition (e.g., irradiation of light or irradiation of light and heating), and is cured under a ceratin condition. The resultant structure is pre-baked, as needed, to form a resin composition layer 3 (FIG. 4B). The resin composition layer 3 can be formed by a coating method such as spin coating, roller coating, bar coating, spraying, or dipping. However, the present invention is not limited to any specific coating method.

Subsequently, pattern exposure is performed in advance onto resin layer portions on the light-transmitting portions 9 by using a photomask 4 to make the exposed portions of the resin layer have affinities for an ink (FIG. 4C). As a result, the resin composition layer 3 has portions 6 having affinities for an ink and portions 5 having no affinities for an ink (FIG. 4D).

After this step, R (red), G (green), and B (blue) inks are discharged onto the resin composition layer 3 by an ink-jet system to color the layer at once (FIG. 4E), and the inks are dried, as needed. As the ink-jet system, a system based on heat energy or a system based on mechanical energy may be used. Either of the systems will do. An ink to be used is not specifically limited as long as it can be used for an ink-jet operation. As coloring materials for the ink, materials suitable for the transmission spectra required for R, G, and B pixels are properly selected from various dyes and pigments.

The colored resin composition layer 3 is cured by irradiation of light or irradiation of light and a heat treatment, and a protective layer 8 is formed, as needed (FIG. 4F). In order to cure the resin composition layer 3, the condition for the above process of forming the portions having affinities for an ink may be changed, e.g., the exposure amount in irradiation of light is increased, or the heating condition is made stricter. Alternatively, both irradiation of light and a heat treatment may be performed.

FIGS. 5A to 5F show another example of the process of manufacturing a color filter.

Figure 5A:
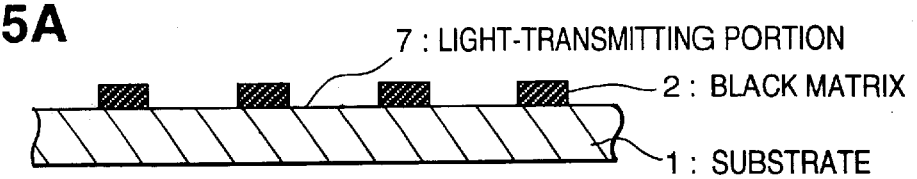
FIGS. 5A to 5F are sectional views showing another color filter manufacturing process.
Figure 5B:
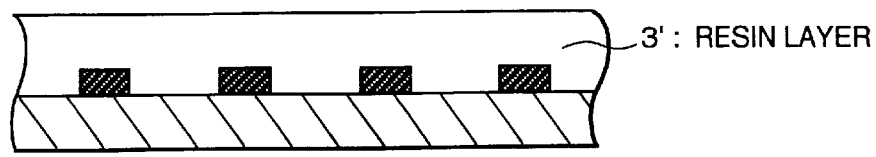

FIG. 5A shows a glass substrate 1 having a black matrix 2 constituted by light-transmitting portions 7 and light-shielding portions. First of all, the glass substrate 1, on which the black matrix 2 is formed, is coated with a resin composition which can be cured upon irradiation of light or irradiation of light and heating, and has ink receptivity. The resultant structure is pre-baked, as needed, to form a resin layer 3' (FIG. 5B). The resin layer 3' can be formed by a coating method such as spin coating, roller coating, bar coating, spraying, or dipping. However, the present invention is not limited to any specific coating method.

Figure 5C:
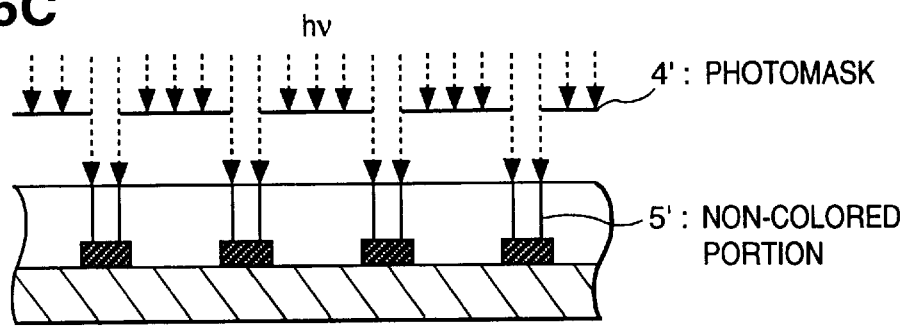
Figure 5D:
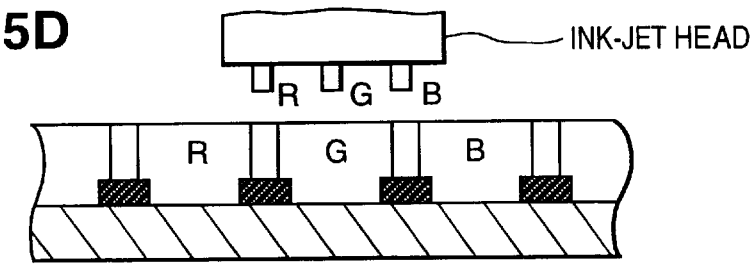

Subsequently, pattern exposure is performed in advance onto resin layer portions light-shielded by the black matrix 2 by using a photomask 4' to cure the exposed portions of the resin layer so as to form portions 5' (non-colored portions) which do not absorb an ink (FIG. 5C). Thereafter, the resin layer is colored in R, G, and B at once by using the ink-jet heads (FIG. 5D), and the inks are dried, as needed.

As the photomask 4' used when pattern exposure is performed, a mask having opening portions for curing the portions light-shielded by the black matrix is used. In this case, in order to prevent a color omission of the color material at a portion in contact with the black matrix, a relatively large amount of ink must be discharged. For this reason, a mask having opening portions each having a size smaller than the width of each light-shielding portion of the black matrix is preferably used.

As an ink to be used for a coloring operation, both dye and pigment inks can be used, and both liquid and solid inks can be used.

As a curable resin composition to be used in the present invention, any resin composition which has ink receptivity and can be cured by at least one of the following treatments: irradiation of light and a combination of irradiation of light and heating, can be used. As resins, acrylic resin, epoxy resin, and silicone resin are available. As cellulose derivatives, hydroxypropyl cellulose, hydroxy ethyl cellulose, methyl cellulose, carboxymethyl cellulose are available, and modified materials thereof are also available.

Optical initiators (crosslinkers) can also be used to crosslink these resins by irradiation of light or irradiation of light and heating. As optical initiators, dichromate, a bis-azide compound, a radical-based initiator, a cation-based initiator, an anion-based initiator, and the like can be used. Mixtures of these optical initiators and combinations of the initiators and sensitizers can also be used. In addition, an optical acid generating agent such as onium salt can be used as a crosslinker. In order to make a crosslinking reaction further progress, a heat treatment may be performed after irradiation of light.

Resin layers containing these compositions have excellent heat resistance, excellent water resistance, and the like, and are sufficiently resistant to high temperatures and cleaning in the subsequent steps.

As an ink-jet system used in the present invention, a bubble-jet type using an electrothermal converter as an energy generating element, a piezoelectric jet type using a piezoelectric element, or the like can be used. A coloring area and coloring pattern can be arbitrarily set.

This embodiment exemplifies the structure in which the black matrix is formed on the substrate. However, after a curable resin composition layer is formed or after coloring is performed, a black matrix may be formed on the resin layer without posing any problem. That is, the form of a black matrix is not limited to that in this embodiment. As a method of forming a black matrix, a method of forming a thin metal film on a substrate by sputtering or deposition, and patterning the film by a photolithographic process is preferably used. However, the present invention is not limited to this.

Figure 5E:
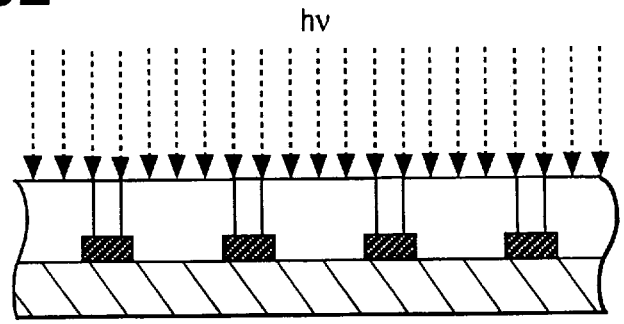
Figure 5F:
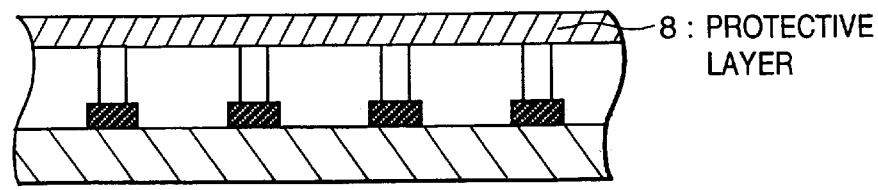

Subsequently, the curable resin composition is cured by performing only one of the following treatments: irradiation of light, a heat treatment, and a combination of irradiation of light and a heat treatment (FIG. 5E). Note that reference symbol hv denotes the intensity of light. When a heat treatment is to be performed, heat is applied instead of hv. The protective layer 8 can be made of a second resin composition of a photo-setting type, thermosetting type, or photo-setting/thermosetting type. The resultant layer needs to have transparency upon formation of a color filter and be sufficiently resistant to the subsequent processes such as an ITO formation process and an aligning film formation process.

Figure 6:
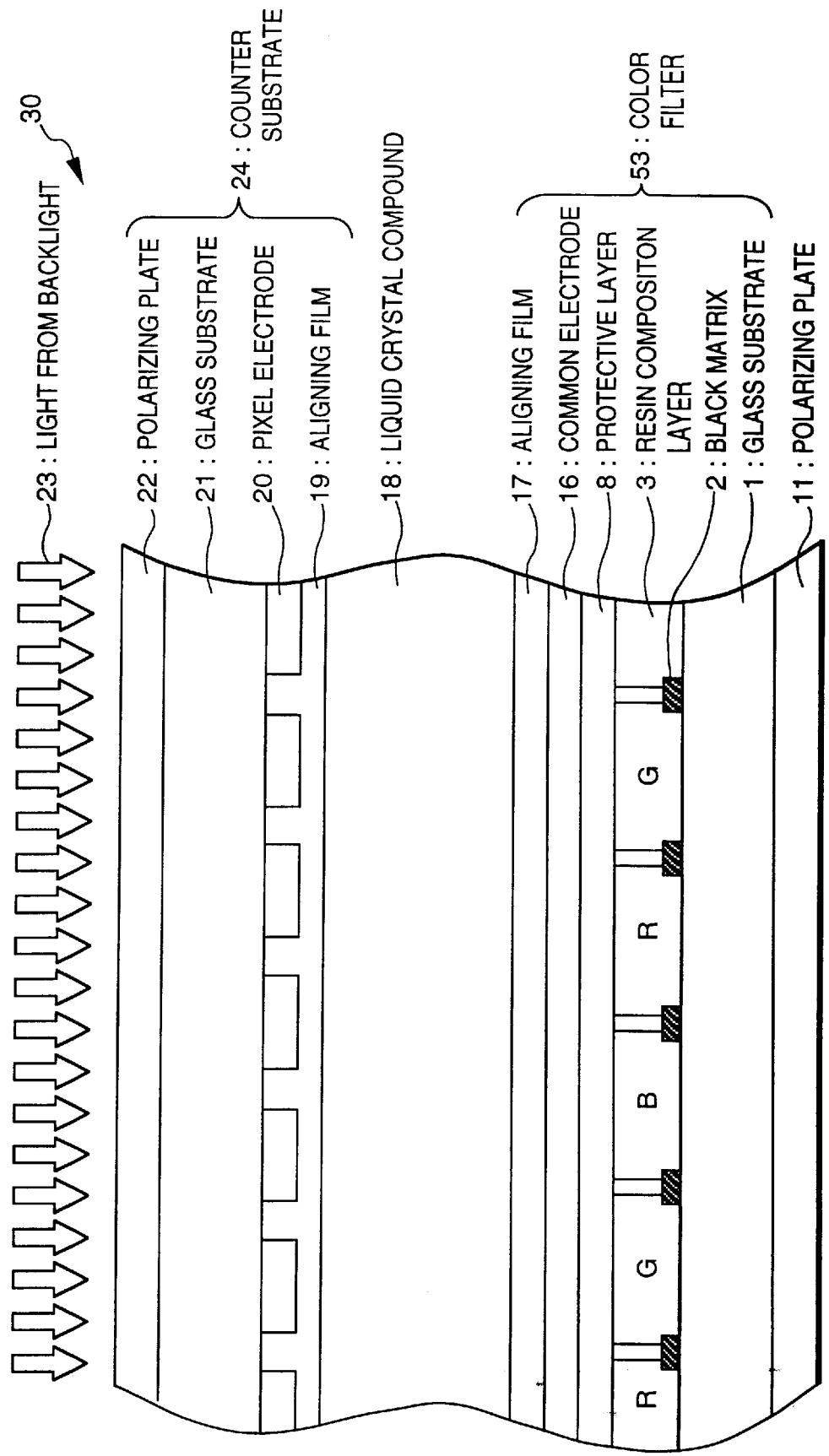
FIG. 6 is a sectional view showing the basic structure of a color liquid crystal display device incorporating a color filter according to the first embodiment.

FIG. 6 is a sectional view showing the basic structure of a color liquid crystal display device 30 incorporating the above color filter.

Reference numeral 11 denotes a polarizing plate; 1, a transparent substrate such as a glass substrate; 2, a black matrix; 3, a resin composition layer; 8, a protective layer; 16, a common electrode; 17, an aligning film; 18, a liquid crystal compound; 19, an aligning film; 20, pixel electrodes; 21, a glass substrate; 22, a polarizing plate; 23, light from backlight; 53, a color filter substrate; and 24, a counter substrate.

In the color liquid crystal display device 30, the liquid crystal compound 18 is sealed between the color filter substrate 53 and the counter substrate 24, and the transparent pixel electrodes 20 are formed on the inner surface of the substrate 21, which opposes the color filter substrate 53, in the form of a matrix. The color filter substrate 53 is positioned such that the R, G, and B pixels are arranged in correspondence with the positions of the pixel electrodes 20.

The aligning films 17 and 19 are respectively formed in the inner surfaces of the two substrates. By performing a rubbing process for the aligning films, the liquid crystal molecules can be aligned in a predetermined direction. The polarizing plates 11 and 22 are bonded to the outer surfaces of the respective substrates. The liquid crystal compound is filled in the gap between these substrates. As a blacklight, a combination of a fluorescent lamp and a scattering plate (none of which are shown) is generally used. A display operation is performed by causing the liquid crystal compound 18 to serve as an optical shutter for changing the transmittance for light emitted from the light from backlight 23.

A case wherein the above liquid crystal display device is applied to an information processing apparatus will be described below with reference to FIGS. 7 to 9.

Figure 7:
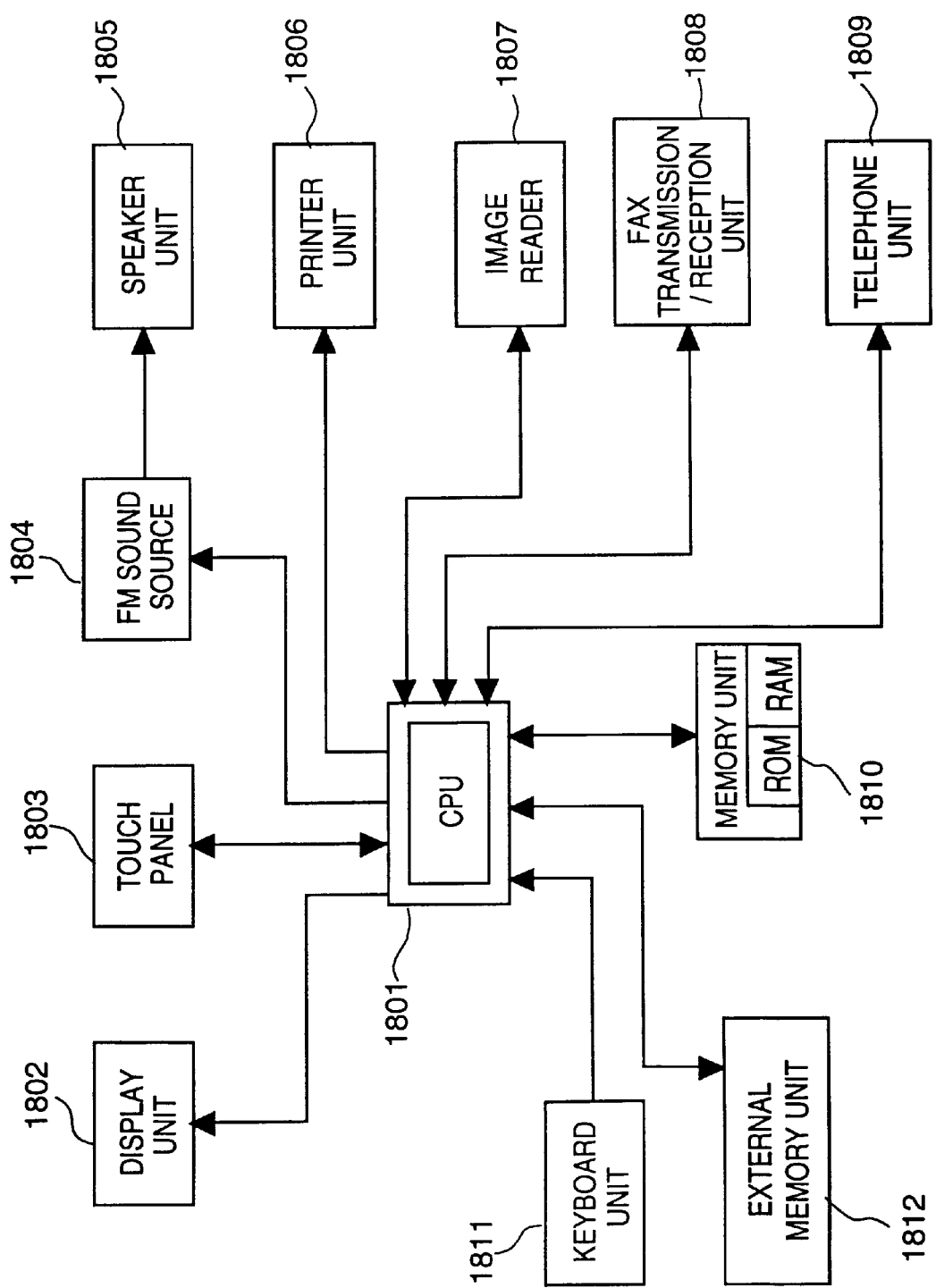
FIG. 7 is a block diagram showing an information processing apparatus in which the liquid crystal display device is used.

FIG. 7 is a block diagram showing the schematic arrangement of an information processing apparatus serving as a wordprocessor, a personal computer, a facsimile apparatus, and a copying machine, to which the above liquid crystal display device is applied.

Referring to FIG. 7, reference numeral 1801 denotes a control unit for controlling the overall apparatus. The control unit 1801 includes a CPU such as a microprocessor and various I/O ports, and performs control by outputting/inputting control signals, data signals, and the like to/from the respective units. Reference numeral 1802 denotes a display unit for displaying various menus, document information, and image data read by an image reader 1807, and the like on the display screen; 1803, a transparent, pressure-sensitive touch panel mounted on the display unit 1802. By pressing the surface of the touch panel 1803 with a finger of the user or the like, an item input operation, a coordinate position input operation, or the like can be performed on the display unit 1802.

Reference numeral 1804 denotes an FM (Frequency Modulation) sound source unit for storing music information, created by a music editor or the like, in a memory unit 1810 or an external memory unit 1812 as digital data, and reading out the information from such a memory, thereby performing FM modulation of the information. An electrical signal from the FM sound source unit 1804 is converted into an audible sound by a speaker unit 1805. A printer unit 1806 is used as an output terminal for the wordprocessor, the personal computer, the facsimile apparatus, and the copying machine.

Reference numeral 1807 denotes an image reader unit for photoelectrically reading original data. The image reader unit 1807 is arranged midway along the original convey passage and designed to read originals for facsimile and copy operations and other various originals.

Reference numeral 1808 denotes a transmission/reception unit for the facsimile (FAX) apparatus. The transmission/reception unit 1808 transmits original data read by the image reader unit 1807 by facsimile, and receives and decodes a sent facsimile signal. The transmission/reception unit 1808 has an interface function for external units. Reference numeral 1809 denotes a telephone unit having a general telephone function and various telephone functions such as an answering function.

Reference numeral 1810 denotes a memory unit including a ROM for storing system programs, manager programs, application programs, fonts, and dictionaries, a RAM for storing an application program loaded from the external memory unit 1812 and document information, a video RAM, and the like.

Reference numeral 1811 denotes a keyboard unit for inputting document information and various commands.

Reference numeral 1812 denotes an external memory unit using a floppy disk, a hard disk, and the like. The external memory unit 1812 serves to store document information, music and speech information, application programs of the user, and the like.

Figure 8:
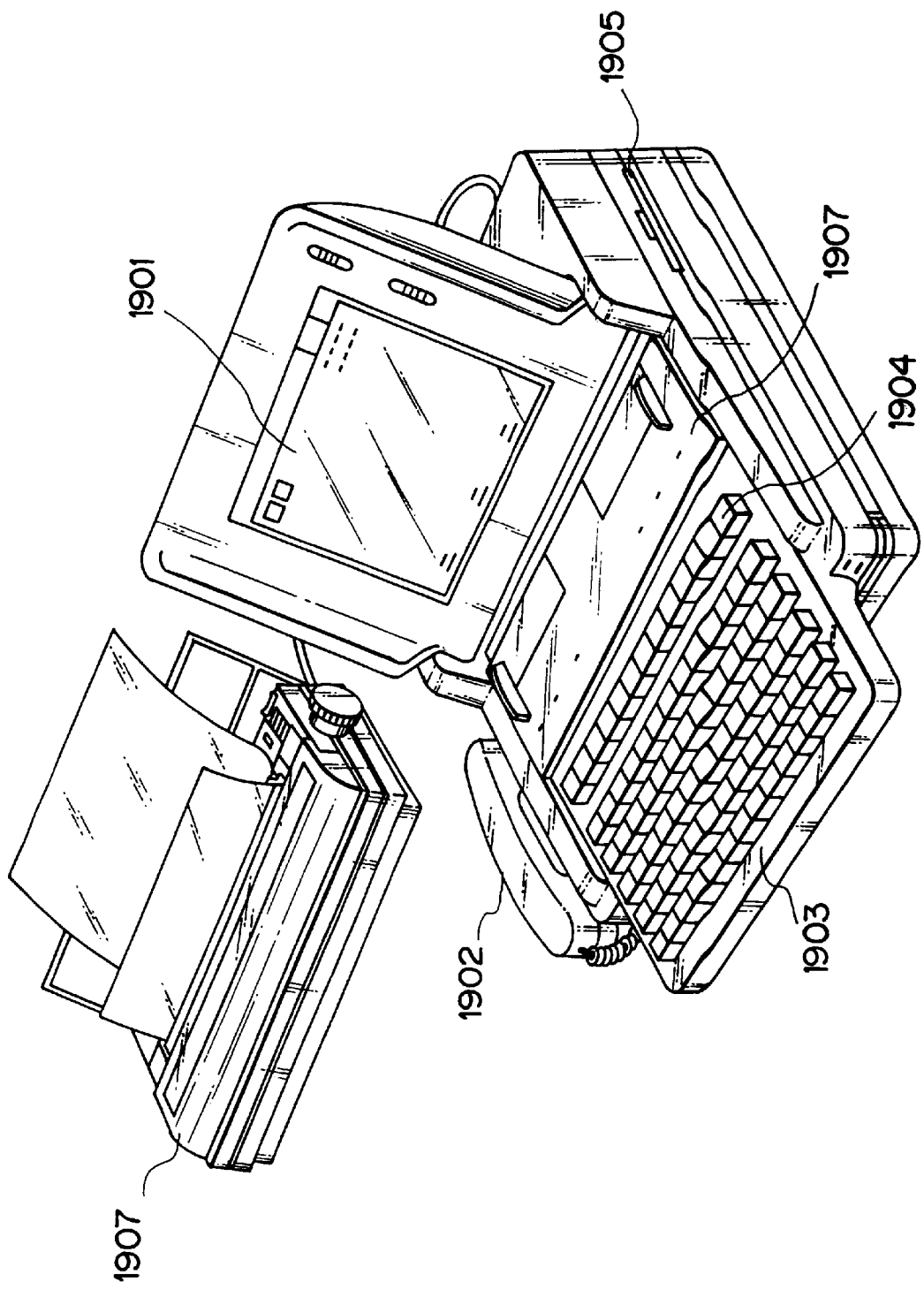
FIG. 8 is a perspective view showing the information processing apparatus in which the liquid crystal display device is used.

FIG. 8 is a perspective view of the information processing apparatus in FIG. 7.

Referring to FIG. 8, reference numeral 1901 denotes a flat panel display using the above liquid crystal display device, which displays various menus, graphic pattern information, document information, and the like. A coordinate input or item designation input operation can be performed on the flat panel display 1901 by pressing the surface of the touch panel 1803 with a finger of the user or the like. Reference numeral 1902 denotes a handset used when the apparatus is used as a telephone set. A keyboard 1903 is detachably connected to the main body via a cord and is used to perform various document functions and input various data. This keyboard 1903 has various function keys 1904. Reference numeral 1905 denotes an insertion port through which a floppy disk is inserted into the external memory unit 1812.

Reference numeral 1906 denotes an original table on which an original to be read by the image reader unit 1807 is placed. The read original is discharged from the rear portion of the apparatus. In a facsimile receiving operation or the like, received data is printed out by an ink-jet printer 1907.

When the above information processing apparatus is to serve as a personal computer or a wordprocessor, various kinds of information input through the keyboard unit 1811 are processed by the control unit 1801 in accordance with a predetermined program, and the resultant information is output, as an image, to the printer unit 1806.

When the information processing apparatus is to serve as the receiver of the facsimile apparatus, facsimile information input through the transmission/reception unit 1808 via a communication line is subjected to reception processing in the control unit 1801 in accordance with a predetermined program, and the resultant information is output, as a received image, to the printer unit 1806.

When the information processing apparatus is to serve as the copying machine, an original is read by the image reader unit 1807, and the read original data is output, as an image to be copied, to the printer unit 1806 via the control unit 1801. Note that when the information processing apparatus is to serve as the receiver of the facsimile apparatus, original data read by the image reader unit 1807 is subjected to transmission processing in the control unit 1801 in accordance with a predetermined program, and the resultant data is transmitted to a communication line via the transmission/ reception unit 1808.

Figure 9:
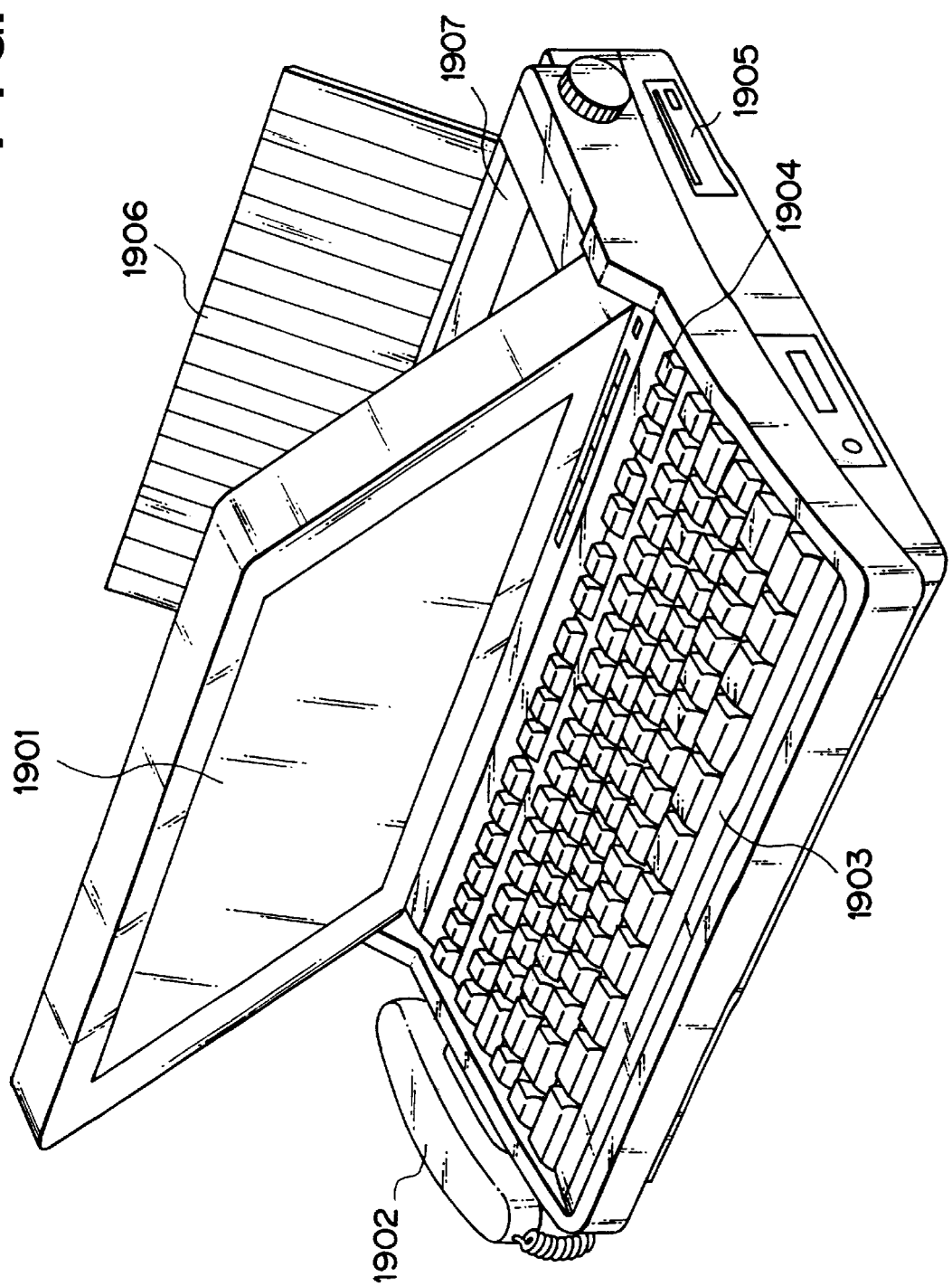
FIG. 9 is a perspective view showing the information processing apparatus in which the liquid crystal display device is used.

Note that the above information processing apparatus may be designed as an integrated apparatus incorporating an ink-jet printer in the main body, as shown in FIG. 9. In this case, the portability of the apparatus can be improved. The same reference numerals in FIG. 9 denote parts having the same functions as those in FIG. 8.

The structure of a multi-filter glass substrate used as a color filter substrate will be described next with reference to FIG. 10. Assume that a 360 mm×460 mm glass substrate is used to manufacture color filters. In this case, four 10-inch color filters, i.e., color filters 35, 36, 37, and 38, can be formed on the substrate.

Figure 11:
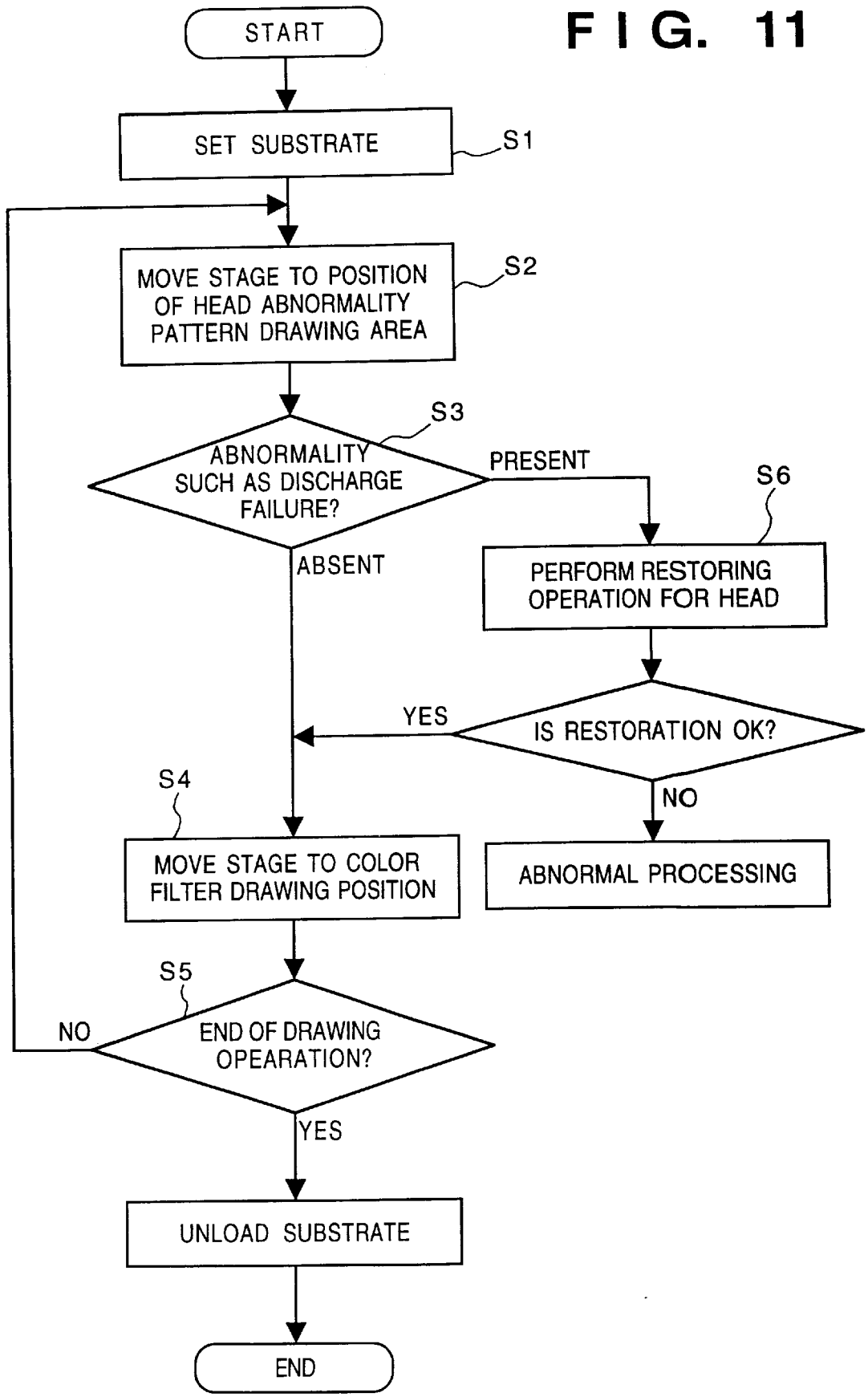
FIG. 11 is a flow chart showing a color filter manufacturing process.

A color filter manufacturing process in this embodiment will be described with reference to FIG. 11. Assume that a head equal in length to a 10-inch substrate in its longitudinal direction is used to sequentially color the color filters 35, 36, 37, and 38. In this case, first of all, the glass substrate 53 is set and positioned on the X-Y-θ stage 52 of the color filter manufacturing apparatus 90 (step S1). After the positioning operation, a discharge failure detection pattern drawing area 31 on the glass plate 53 is moved to a position immediately below the coloring head 55 (step S2) to draw a pattern like the one shown in FIG. 12. This pattern is recognized by the TV camera 56 and the image processing apparatus 57 (step S3). If it is determined that no abnormality is present, the X-Y-θ stage 52 moves a color filter formation area 35 to a position immediately below the coloring head 55 (step S4) to execute coloring of the pixels of the color filter. When coloring of the color filter formation area 35 is completed, the X-Y-θ stage 52 moves a discharge failure detection pattern formation area 32 to a position immediately below the coloring head 55 (step S5). The same operation as described above is repeated three times to color filter formation areas 36, 37, and 38. If an abnormality such as a discharge failure is detected in step S3, coloring of the pixel portion of the color filter is immediately stopped, and a restoring operation is executed by a head restoring means (step S6) or the head is replaced (step S7).

(Second Embodiment)

In the first embodiment, a discharge failure detection pattern is drawn on the glass substrate 53 by the ink-jet head immediately before coloring of the effective pixel portion of a color filter is performed. In the second embodiment, before coloring of a pixel portion is performed, a pre-discharging operation is performed onto a glass substrate 53 to stabilize the discharging operation of each ink-jet head. In general, while an ink is continuously discharged from an ink-jet head, the amount of ink discharged from each nozzle is stable. Once discharging of the ink is stopped, the amount of ink discharged becomes unstable when a discharging operation is resumed. This is because, for example, the ink is dried in each nozzle. More specifically, if an ink discharging operation is stopped for several minutes, discharging of first several to ten-odd ink becomes unstable when a discharging operation is resumed. Discharging of an ink may become unstable depending on the type of ink even if a discharging operation is stopped for only several tens seconds. In this embodiment, a pre-discharging operation is performed onto the glass substrate 53 immediately before the pixels of a color filter are colored. Coloring of an effective pixel portion is started after the ink discharged state is stabilized.

Figure 13A:
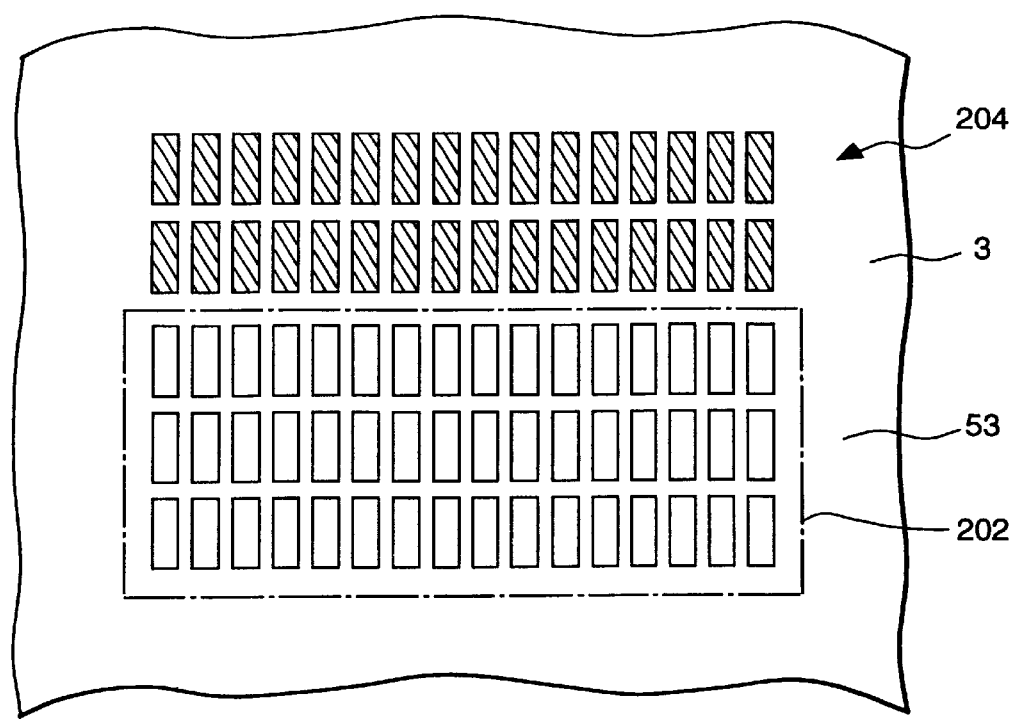
FIGS. 13A and 13B are views each showing a pre-discharging pattern on a glass substrate.
Figure 13B:
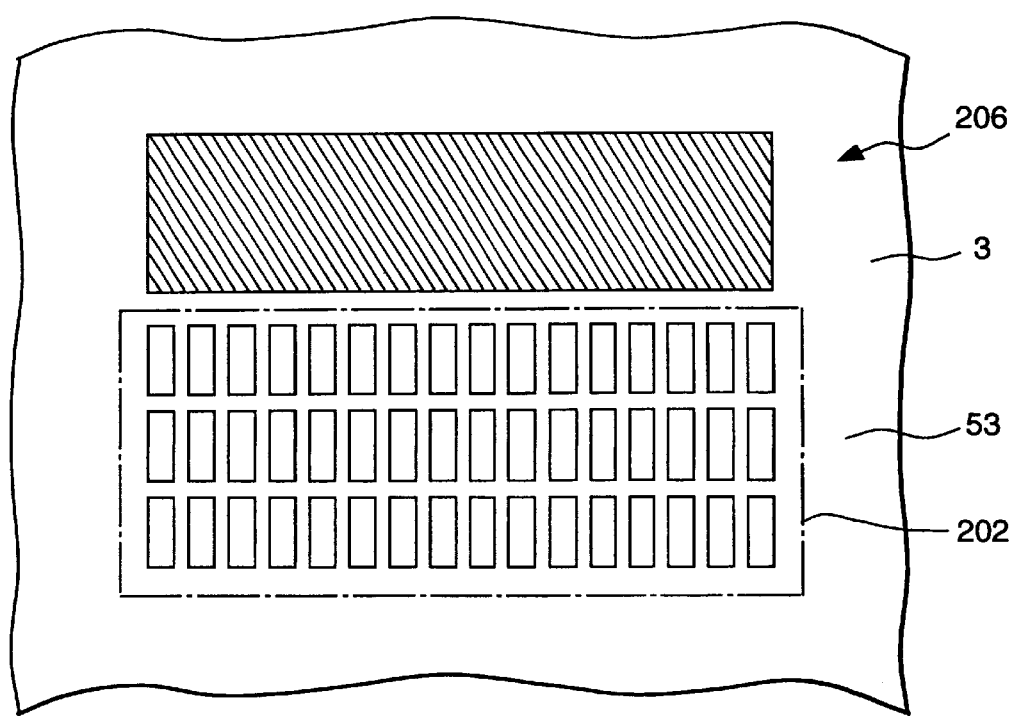

FIGS. 13A and 13B show pre-discharging patterns on the glass substrate 53. As shown in FIGS. 13A and 13B, an ink is pre-discharged onto a pre-discharging area 204 or 206 adjacent to an effective pixel portion 202 on the glass substrate 53 immediately before coloring of the pixels of the effective pixel portion 202 on the glass substrate 53 is started. In forming an ink discharging pattern for a pre-discharging operation, an ink may be discharged at the same pitch as that of the array pattern of pixels of the effective pixel portion 202, as shown in FIG. 13A, or an ink may be discharged to paint a certain range all over, as shown in FIG. 13B. In this embodiment, in particular, since the interval between the nozzles of an ink-jet head is set to 70.5 μm with respect to the pitch (e.g., 300 μm) of pixels of the same color, pixels of the same color are colored by always using every fifth nozzle, but the remaining nozzles are not generally used. If, however, a discharge failure or the like occurs in a given nozzle which is always used, each discharging position may be shifted by one nozzle to perform a coloring operation by using spare nozzles. In this case, since the nozzles which are not used in a normal operation are used, a discharge failure or the like may occur. In contrast to this, if an ink is discharged from all the nozzles in a pre-discharging operation as in the above case, all the nozzles are ready for a discharging operation. In this case, a proper discharging operation can be performed even if the nozzles to be used are changed. In addition, instead of forming a pre-discharging pattern like the one shown in FIG. 13A or 13B, alignment marks used when the counter substrate is bonded to the glass substrate 53 to form a liquid crystal display device may be formed.

Figure 14A:
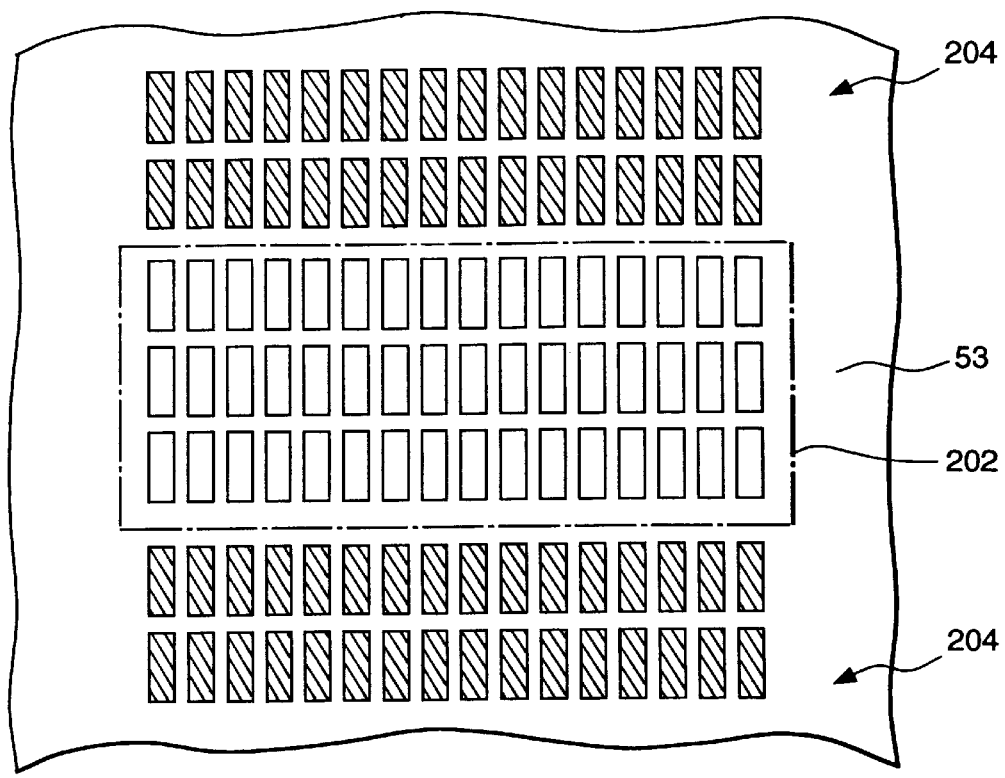
FIGS. 14A to 14D are views each showing a pre-discharging pattern on a glass substrate.
Figure 14B:
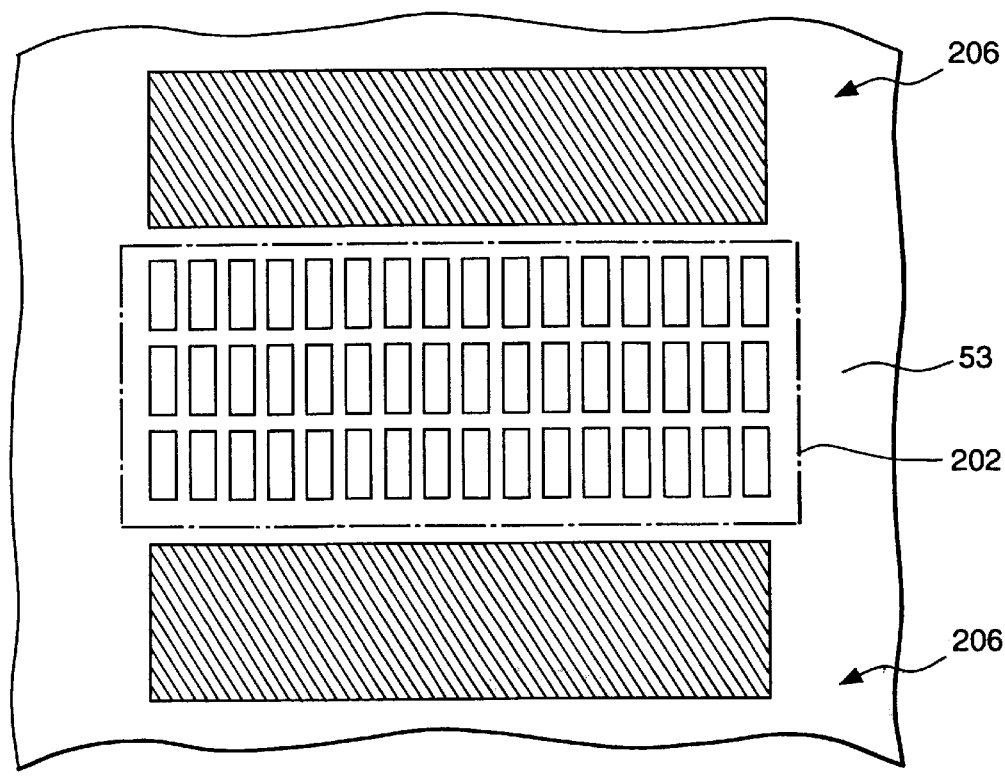
Figure 14C:
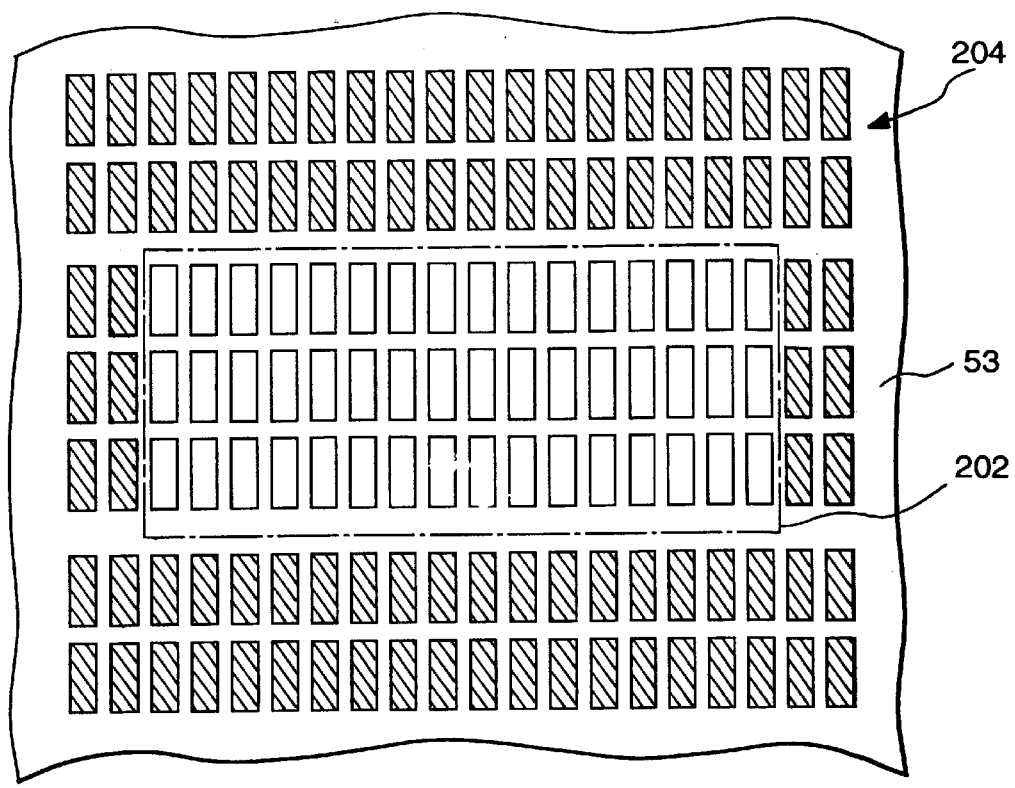
Figure 14D:
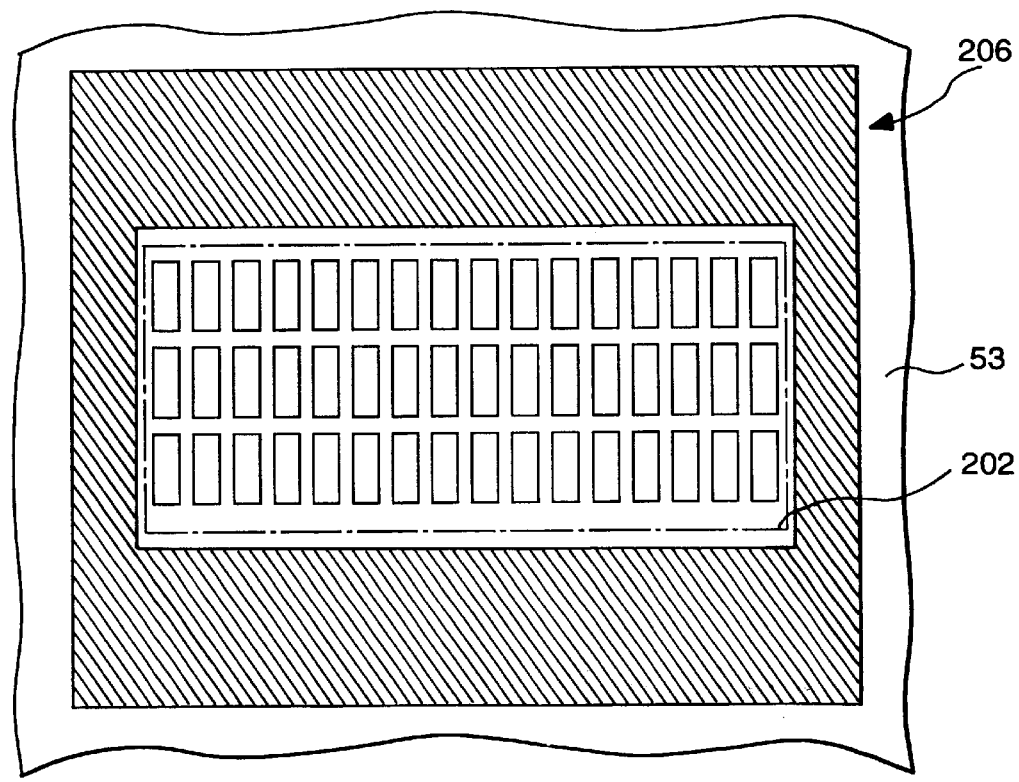

At the portions to which an ink is discharged, i.e., the pre-discharging area 204 or 206 and the effective pixel portion 202, the corresponding portions of a resin composition layer 3 formed on the glass substrate 53 absorb the ink and slightly swell. For this reason, the portions to which the ink is discharged and the portions to which no ink is discharged constitute a slight uneven pattern on the color filter. In this case, any significant problem is not posed now. However, the bonding portion may reduce in the future with an increase in screen size and a decrease in frame size. In this case, if the pre-discharging area 204 or 206 is formed on only one side of the effective pixel portion 202, when the counter substrate is bonded to the glass substrate 53, the substrate interval on the side where the pre-discharging area 204 or 206 is not formed decreases. As a result, substrate interval irregularity may occur. For this reason, for example, as shown in FIGS. 14A and 14B, pre-discharging areas 204 or 206 may be formed on the two sides of an effective pixel portion 202 to make the levels of the portions of a resin composition layer 3 on the two sides of the effective pixel portion 202 equal to each other, thereby eliminating substrate interval irregularity. This object can be achieved more effectively by further forming pre-discharging areas on the right and left sides of the effective pixel portion 202, as shown in FIGS. 14C and 14D, as well as on the front and read sides of the effective pixel portion 202, as shown in FIGS. 14A and 14B.

As described above, according to this embodiment, since a pre-discharging operation is performed on a side of the effective pixel portion of a color filter, no portion for receiving a pre-discharged ink need be prepared outside a substrate. The arrangement of the apparatus can therefore be simplified. In addition, since a pre-discharging area is adjacent to an effective pixel portion, a discharging operation can be started immediately after a pre-discharging operation is completed. For this reason, the effective pixel portion can be colored while the high discharge stability of the ink-jet head, which is set after the pre-discharging operation, is maintained.

(Third Embodiment)

A color filter manufacturing process according to the third embodiment of the present invention will be described below.

First of all, as shown in FIG. 1, a color filter substrate 53 is set on a color filter manufacturing apparatus 90, and the color filter substrate 53 is aligned with an ink-jet head IJH. Thereafter, inks of the respective colors are discharged onto desired pixels in desired amounts.

In this case, according to this embodiment, coloring is started from a position outside an effective pixel portion 202, which is actually used, to color the effective pixel portion 202 with uniform amounts of inks.

In general, an ink-jet head can stably discharge an ink while it keeps discharging the ink continuously or in a repetitive pattern. However, the amount of ink discharged is unstable for an initial period when the head starts discharging the ink, or moves to the next line to discharge the ink.

For example, the amount of ink discharged first is small, as shown in FIG. 15A, the amount of ink discharged first is larger than that in a normal state, as shown in FIG. 15B, or the landing point of an ink droplet shifts from the center of the ink density, as shown in FIG. 15C.

When the ink-jet head IJH or the glass substrate 53 is moved without discharging an ink, the solvent in the ink evaporates, so that the density or viscosity of the ink changes. As a result, the above phenomena occur.

Figure 16A:
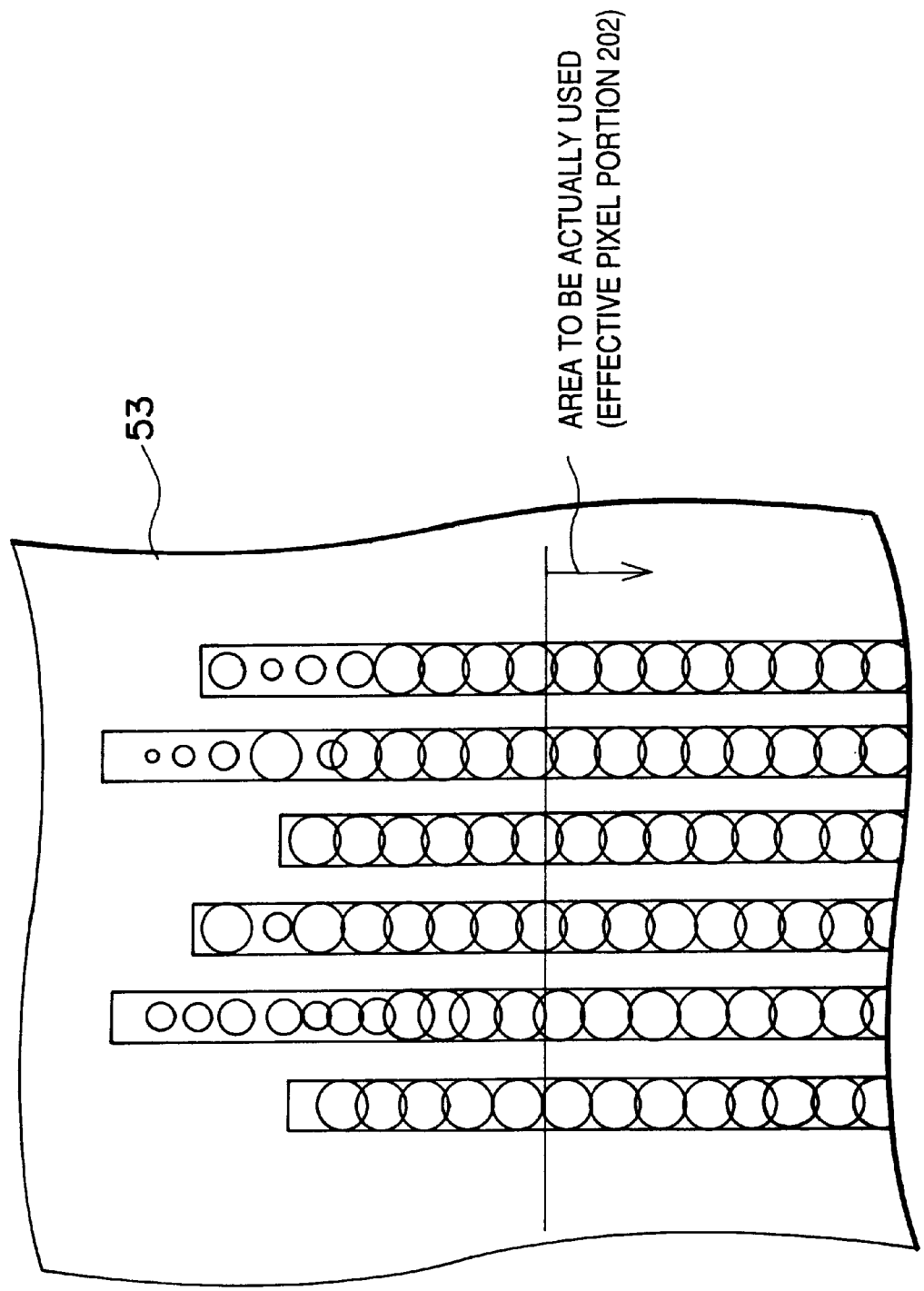
FIG. 16A is a view showing how the length of a pre-discharging operation is changed depending on variations in the state of each discharging nozzle.
Figure 16B:
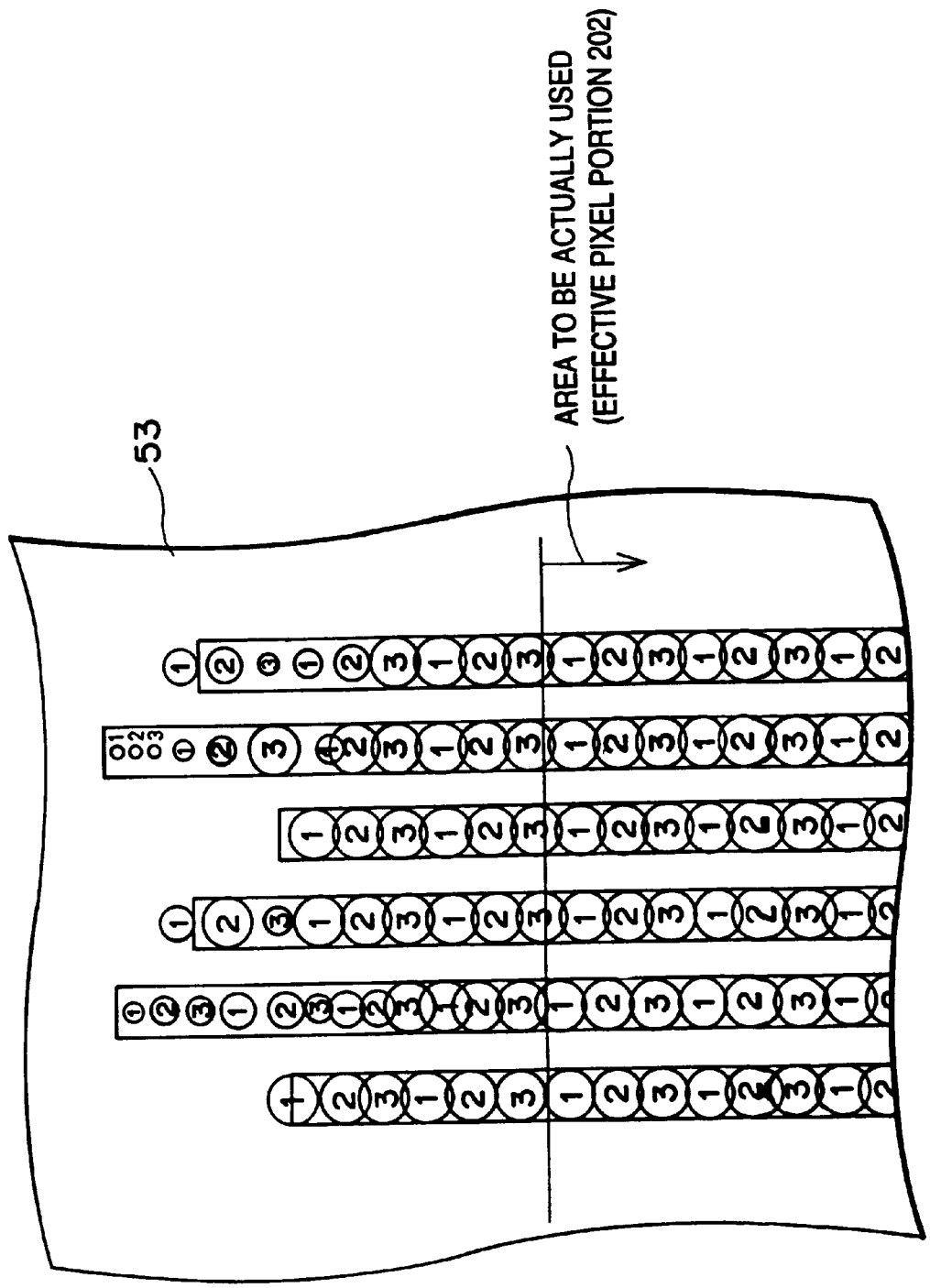
FIG. 16B is a view for explaining a pre-discharging operation based on a multi-path method.

As a pre-discharging area in this embodiment, a pattern which is similar to a color filter portion (effective pixel portion 202) and extends therefrom may be used, as shown in FIGS. 15A to 15C. Alternatively, as shown in FIGS. 16A and 16B, only the types of inks whose discharged states are unstable may be pre-discharged to longer distances.

Figure 17:
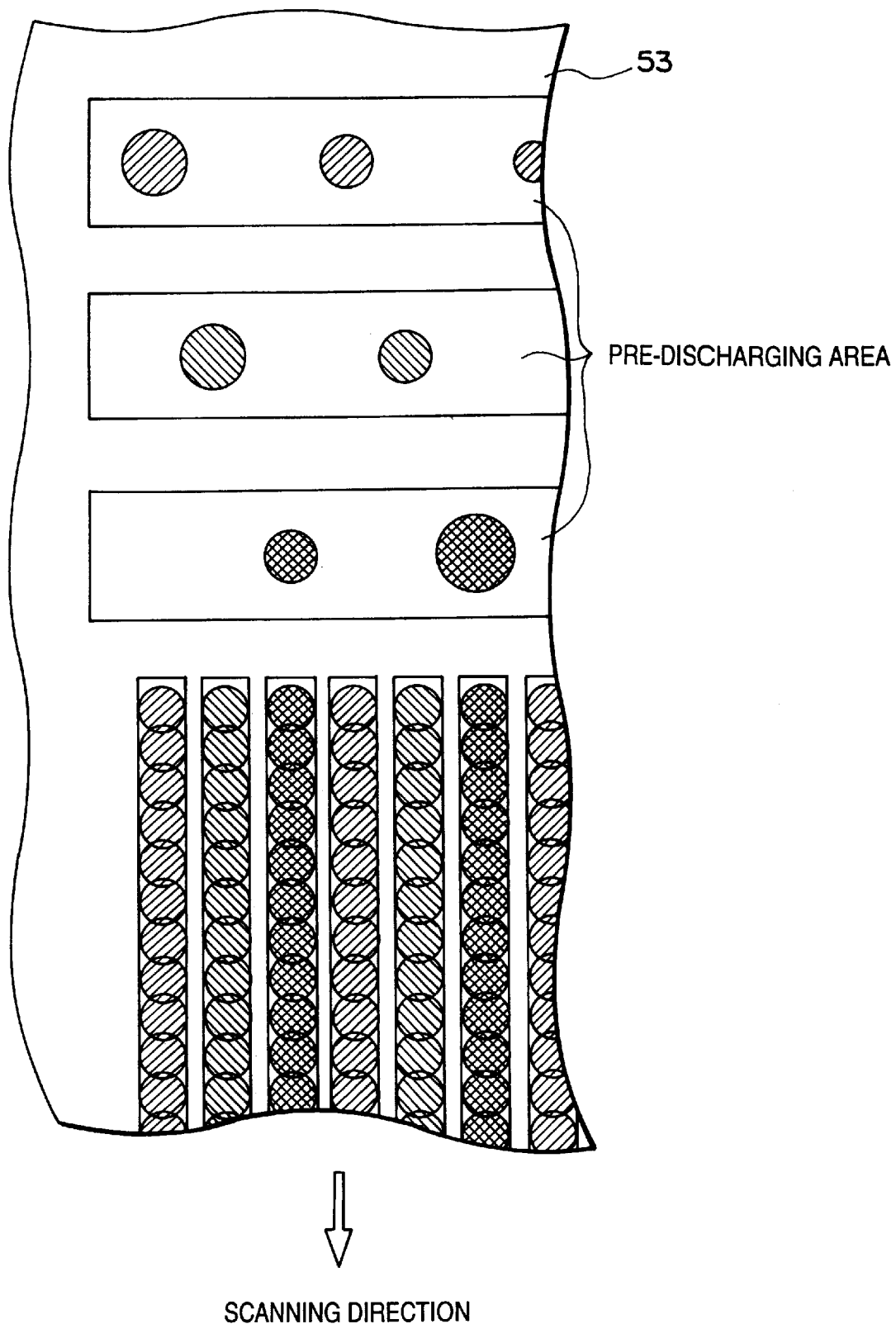
FIG. 17 is a view showing a pre-discharging pattern.

Alternatively, as shown in FIG. 17, inks may be discharged onto pre-discharging areas formed on an end portion of the glass substrate 53 until discharging operations are stabilized. Thereafter, coloring may be started. If the resin composition layer 3 or 3' shown in FIGS. 4A to 4F or 5A to 5F is not formed on these pre-discharging areas, a dye ink on the pre-discharging areas can be washed off by cleaning the substrate with water after the resin composition layer 3 or 3' is cured.

Even if the coloring/scanning direction is perpendicular to or set at a given angle with respect to the surface of a pixel pattern, it suffices to form pre-discharging areas at a start position in the scanning direction.

As a coloring method, a multi-path method is available. In this method, ink are discharged several times in an overlapping state. In this case, a discharging operation is stopped every time coloring of one line is completed. A pre-discharging operation is therefore required for every line. Similar to the above coloring operation, in this case, a pre-discharging operation may be performed outside an effective pixel portion every time coloring of one line is completed, and coloring of effective pixels may be started when a discharging operation is stabilized. FIG. 16B shows such a case.

Examples in which color filters were actually manufactured will be described below.

EXAMPLE 1

A material having a water ink absorption property (a terpolymer of N-methylolacrylamide, methyl methacrylate, and hydroxyethylmetacrylate) was applied to a glass substrate (substrate glass), on which a black matrix pattern was formed, by spin coating. The resultant structure was pre-baked at 60° C. for 10 minutes to form a resin composition layer. At this time, the thickness of the resin composition layer was about 1 μm.

Subsequently, the portions between the pattern elements of the black matrix were colored by a manufacturing apparatus using ink-jet heads, like the one shown in FIG. 1, using R, G, and B inks.

In this case, a drawing operation was started from a position 3 mm outside a pattern actually used as a pixel portion ("X" in FIGS. 15A to 15C).

The discharged ink were dried at 90° C. for 30 minutes. Subsequently, the resultant structure was heated at 200° C. for one hour to cure the colored composition layer, thereby forming a color filter.

The actual pixel portion of the color filter formed in this manner was free from color mixing. In addition, the color density of an end portion of the color filter fell within a variation of 5% as compared with the density of the remaining pixel area. Furthermore, any defects such as color omissions were not observed in the actual pixel area.

EXAMPLE 2

A composition was made up of (a) 10 parts by weight of a terpolymer of N-methylolacrylamide, methyl methacrylate, and hydroxyethylmetacrylate and (b) 0.4 parts by weight of triphenylsulfonium trifurato (TPS-105 available from Midori Kagaku) to have a water ink absorption property. Upon irradiation of light or irradiation of light and a heat treatment, the ink absorption property of the irradiated portions of the composition deteriorated, and the composition exhibited repellency to the ink. This composition was applied to a glass substrate (#70 available from Corning), on which a black matrix pattern was formed, by spin coating. The resultant structure was pre-backed at 60° C. for 10 minutes, and exposure was performed by a high-pressure mercury lamp via a photomask having a pattern finer than that of the black mask. After the exposure step, the resultant structure was heated by a hot plate at 100° C. for 90 seconds to form a pattern constituted by ink-receiving portions and color mixing prevention areas.

Subsequently, as in Example 1, coloring was performed by an ink-jet system using R, G, and B inks. The coloring operation was started from a position 3 mm outside a pattern actually used as a pixel portion, as shown in FIGS. 15A to 15C.

A color filter was then formed in the same manner as in Example 1.

The actual pixel portion of the color filter formed in this manner was free from color mixing. In addition, the color density of an end portion of the color filter fell within a variation of 2%. Furthermore, since the method in Example 2 can use a resin composition layer having a finer pattern than the method in Example 1, a high-resolution color filter can be formed (the actual pixel width is 65 μm).

EXAMPLE 3

A liquid crystal device was formed by using the color filter obtained in Example 2.

As shown in FIG. 6, an ITO film having a thickness of 500 Å was formed as a transparent electrode 16 by a sputtering method. A polyimide forming solution ("PIQ" available from Hitach Chemical Co., Ltd.) was applied to the transparent electrode 16 by a spinner which rotated at 3,000 rpm, and the resultant structure was heated at 150° C. for 30 minutes to form a 2,000-Å thick polyimide film as an aligning film 17. Thereafter, a rubbing process was performed for the surface of this polyimide film.

The color filter substrate formed in this manner was bonded to a counter substrate 21 to form a cell. A ferroelectric liquid crystal was filled in the cell and sealed, thereby obtaining a liquid crystal device. When this liquid crystal device incorporating the color filter having excellent flatness was observed with a polarizing microscope of crossed nicols, no alignment defect was found in the liquid crystal device. In addition, with the high-resolution color filter pattern, the liquid crystal device had excellent display quality.

If a liquid crystal device using a thin-film transistor type liquid crystal is formed by the method of this embodiment, the same effects as described above can be obtained.

EXAMPLE 4

In Example 2, as shown in FIGS. 16A and 16B, only the lengths (X) of pre-discharging patterns corresponding to patterns of colors for which it takes time to stabilize a discharging operation may be increased. A BM (black matrix) pattern was made identical to a resin composition layer pattern so that alignment between the BM pattern and each ink-jet head or tracking correction of correcting coloring positions could be easily performed.

EXAMPLE 5

In Example 2, a drawing operation was performed by discharging an ink while moving (scanning) each head or the substrate at a constant speed. However, as shown in FIG. 17, after an ink may be discharged at a specific place until a discharging operation is stabilized, a desired pattern may be drawn. In this case, if a resin composition layer in the predetermined place (pre-discharging area) is removed, the unnecessary ink can be washed off by cleaning the filter with water after the resin composition layer is cured.

Figure 18:
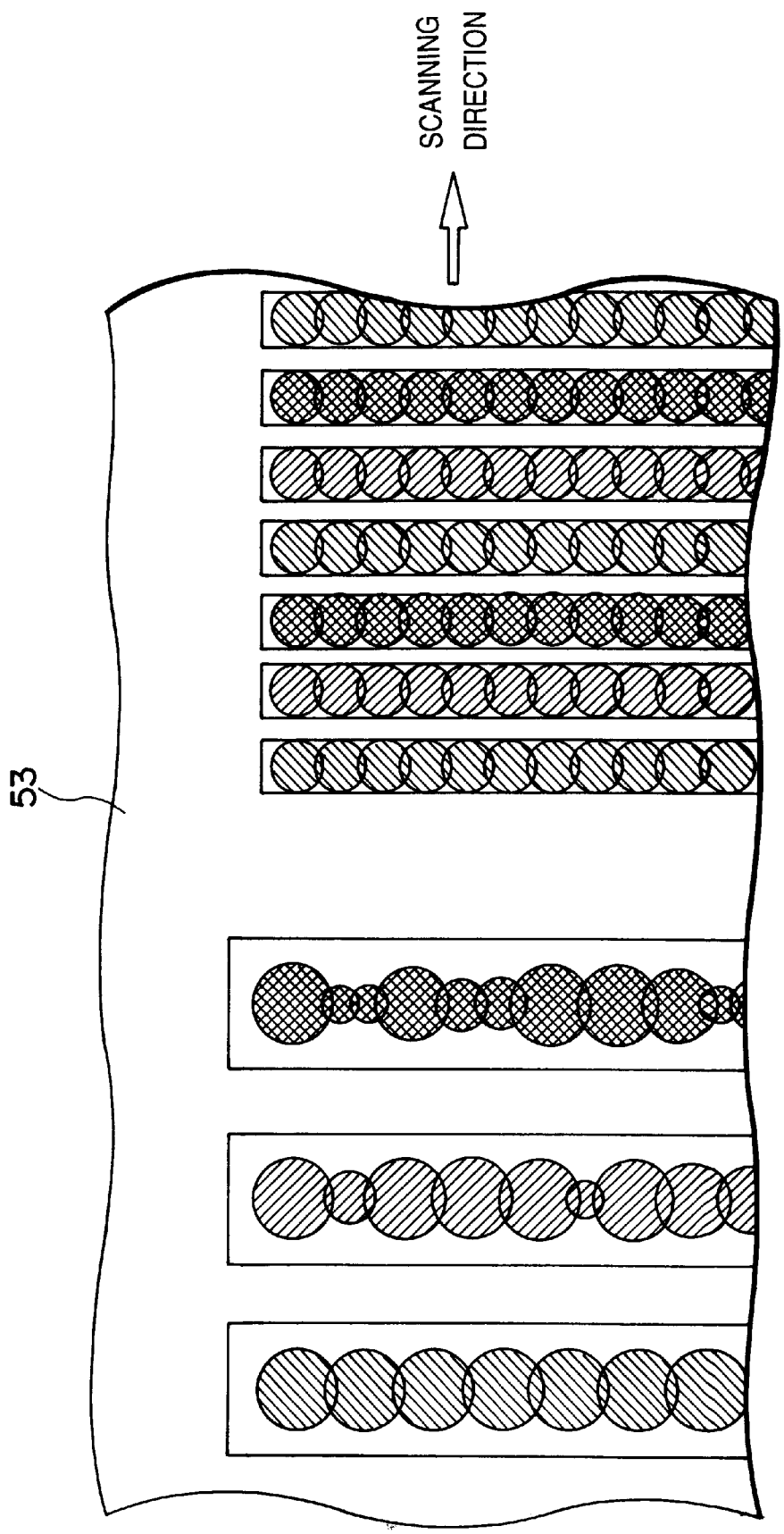
FIG. 18 is a view showing a pre-discharging pattern.

In addition, even if a different scanning direction is set, as shown in FIG. 18, pre-discharging areas may be formed outside a pixel pattern.

(Fourth Embodiment)

Figure 19:
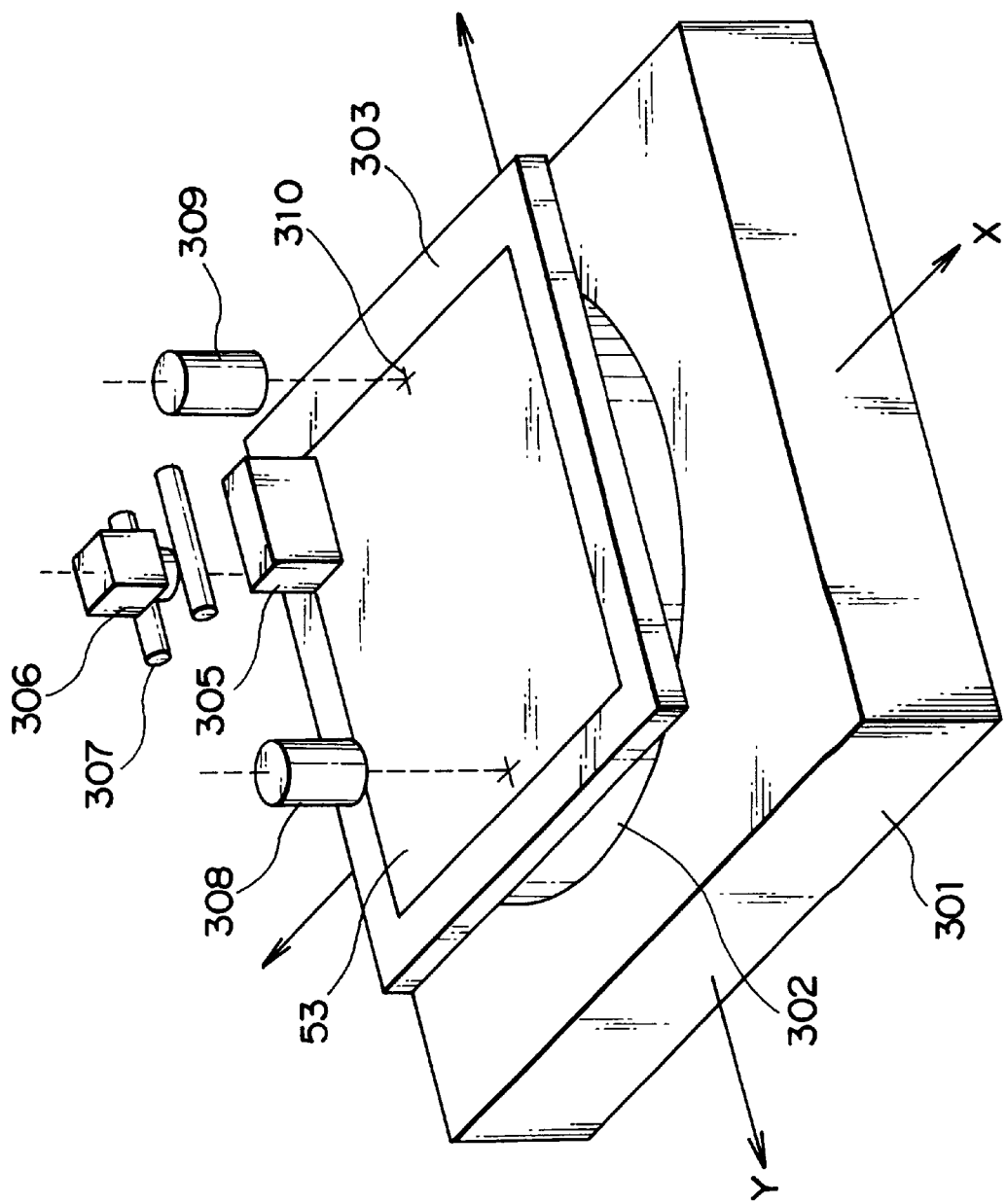
FIG. 19 is a perspective view showing the overall arrangement of a color filter manufacturing apparatus according to the fourth embodiment of the present invention.

FIG. 19 shows the overall structure of a color filter manufacturing apparatus according to the fourth embodiment of the present invention. Referring to FIG. 19, reference numeral 301 denotes a moving mechanism such as a stage for moving a glass substrate 53 (to be colored) in the X and Y directions in FIG. 19; 302, a rotary stage positioned to rotate the glass substrate 53 in the θ direction; 303, a base for holding and fixing the glass substrate 53; 305, an ink-jet head for coloring; a 306, a sensor for reading a colored pattern; and 307, a light source for irradiating light onto the image sensing area of the sensor 306. Alignment marks 310 are formed on the glass substrate 53 in advance. The positions of these marks can be read by an alignment sensor 308 and an alignment sensor 309.

Figure 20:
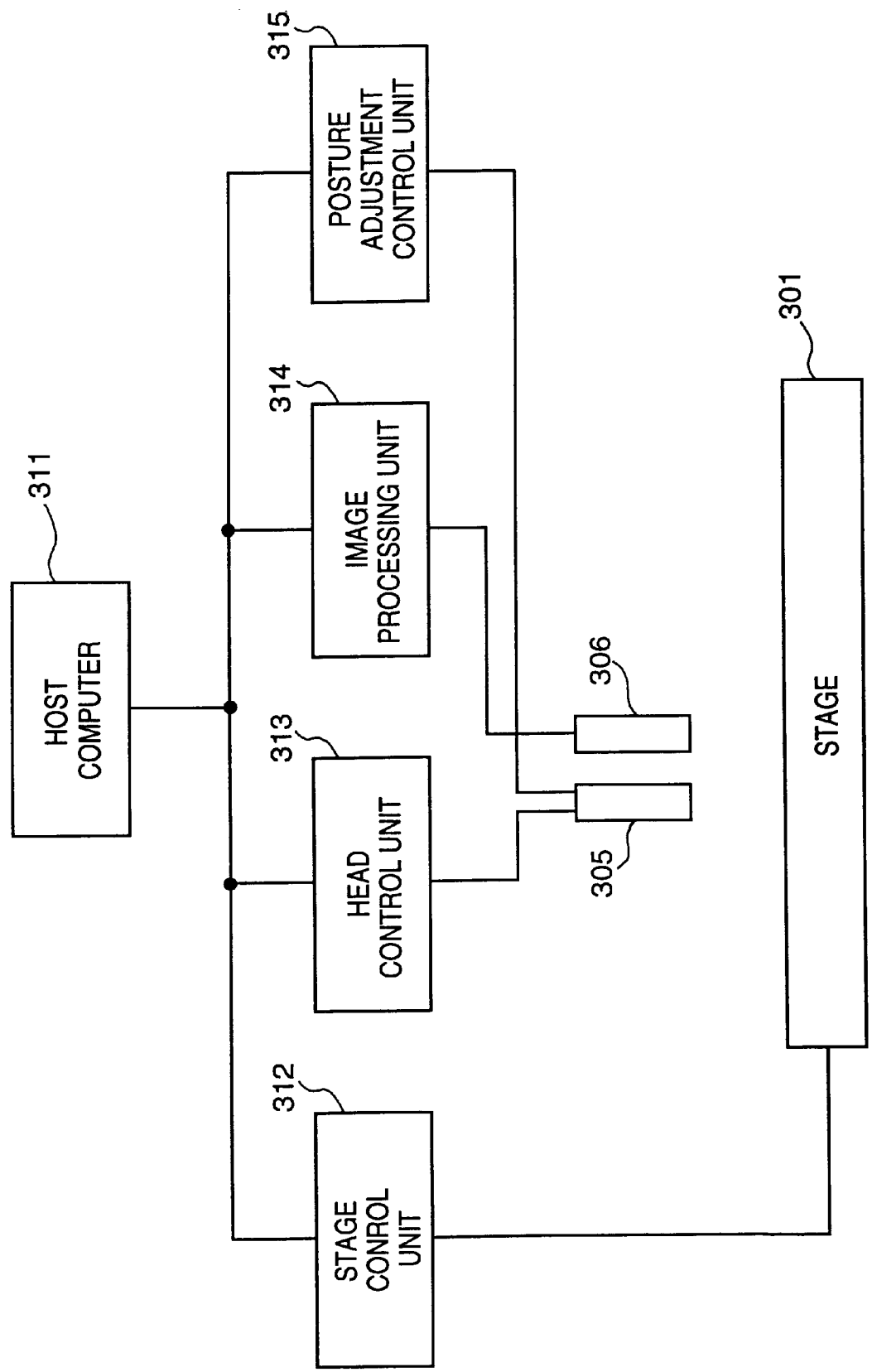
FIG. 20 is a block diagram of the color filter manufacturing apparatus.

FIG. 20 is a block diagram showing the color filter manufacturing apparatus. Referring to FIG. 20, reference numeral 311 denotes a host computer for controlling the overall operation of the apparatus; 312, a control unit for the stage 301; 313, a control unit for the ink-jet head 305 for coloring; 314, an image processing unit for, e.g., detecting the presence/absence of an ink discharge failure in the ink-jet head 305 or measuring the landing position of an ink droplet or the position of a pixel on the basis of image data read by the sensor 306; 315, a posture adjustment control unit for controlling the posture and position of the ink-jet head 305; and 301, a stage.

Figure 21:
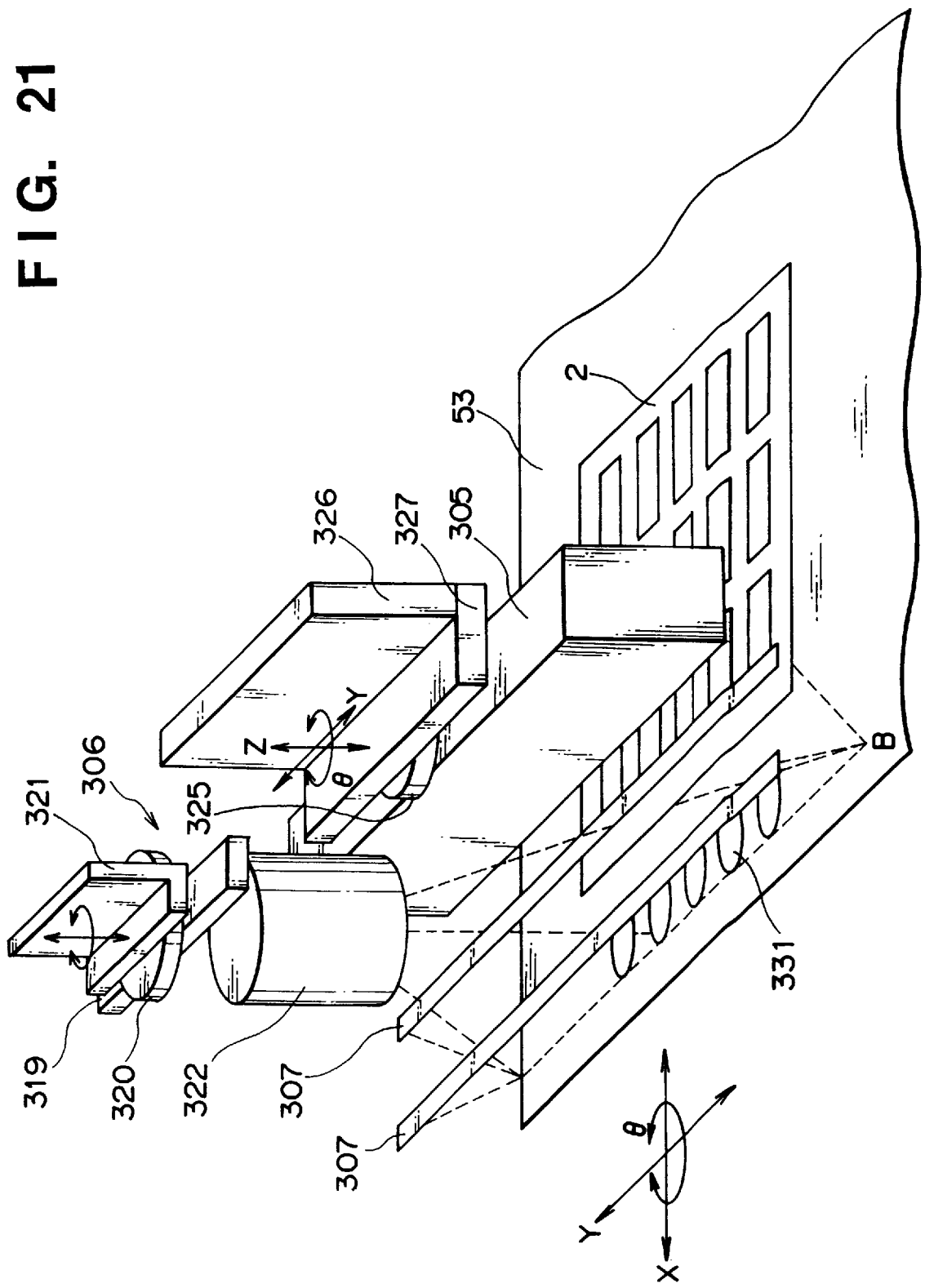
FIG. 21 is a perspective view showing the positions of an ink-jet head, a sensor, and a light source, described with reference to FIG. 19, in detail.

FIG. 21 shows the positions of the ink-jet head 305, the sensor 306, and the light source 307 in FIG. 19 in detail. The posture of the ink-jet head 305 can be adjusted by a θ-direction adjustment mechanism 325, a Z-direction adjustment mechanism 326, and a Y-direction adjustment mechanism 327. The distance between the ink-jet head 305 and the glass substrate 53 can be set to a predetermined distance by the Z-direction adjustment mechanism 326. The θ-direction adjustment mechanism 325 can set the ink-jet head 305 at a predetermined angle with respect to the glass substrate 53. The posture adjustment mechanisms 325, 326, and 327 constitute the Y-, Z-, and θ-axes with a combination of a linear stage, a rotary stage, and the like. The moving mechanism of each axis may be moved manually or a driving source such as a motor. The ink-jet head 305 has a plurality of ink discharging openings, which are arranged in the Y direction in FIG. 21.

Reference numeral 319 denotes an image sensing element such as a CCD line sensor. An image on a straight line connecting two points A and B on the glass substrate 53 is formed on the line sensor 319 via a lens 322. The posture of the line sensor 319 can be adjusted by a θ-direction adjustment mechanism 320 and a Z-direction adjustment mechanism 321. Reference numeral 53 denotes a glass substrate; and 2, a black matrix (to be referred to as a BM hereinafter) formed on the glass substrate 53. The relative positional relationship between the glass substrate 53, the inkjet head 305, and the line sensor 319 can be changed in the X, Y, and θ directions by the moving mechanisms 301 and 302 in FIG. 19. When the glass substrate 53 is moved while an ink is discharged from the ink-jet head 305, a colored pattern is formed on the glass substrate 53. When the line sensor 319 performs a reading operation while the glass substrate 53 is moved, a color pattern or a BM (black matrix) pattern formed on the glass substrate 53 can be read. The position of the color pattern or the BM pattern can be calculated. The positional relationship between the colored pattern and the BM pattern and the presence/absence of an ink discharge failure in the ink-jet head 305 can be detected. In this case, coloring and reading operations may be performed simultaneously or separately performed while the stage is moved once. Reference numeral 331 indicates how ink discharged from a plurality of discharging openings of the ink-jet head 305 collide with a blank portion on the glass substrate 53 outside the BM.

FIG. 22 shows the relationship between the discharging openings of a plurality of coloring heads and the glass substrate 53 to be colored. Referring to FIG. 22, reference numeral 334 denotes a blue head for discharging a blue (B) ink; and 333, discharging openings. Reference symbols B1, B2, . . . denote discharging opening numbers. In addition to the B head, this apparatus includes a plurality of coloring heads, i.e., green (G) and red (R) heads. The discharging opening numbers of the respective coloring heads are denoted by reference symbols G1, G2, . . . and R1, R2, . . . . Reference numeral 2 denotes a BM pattern formed on the substrate, and 335, light-transmitting portions. R, G, and B inks are repeatedly discharged onto the light-transmitting portions 335 in a relative moving direction S and a direction perpendicular thereto. Ink of the same color are discharged onto light-transmitting portions adjacent to each other in the relative moving direction S. The coloring head 334 is set at an angle θ with respect to the glass substrate 53. Even if the pitch of the discharging openings of each coloring head is different from the pitch of the light-transmitting portions, the apparatus can properly respond to arbitrary pitches by adjusting the angle θ.

In the case shown in FIG. 22, of the discharging openings of the R head, the discharging openings R1, R4, R7, . . . are used for a coloring operation, but the remaining discharging openings R2, R3, R5, R6, . . . are not used and are set as spare discharging openings. Similarly, of the discharging openings of the G head, the discharging openings G1, G4, G7, . . . are used, but the discharging openings G2, G3, G5, G6, . . . are set as spare discharging openings. Of the discharging openings of the B head, the discharging openings Bi, B4, B7, . . . are used, but the discharging openings B2, B3, B5, B6, . . . are set as spare discharging openings. If a discharge failure occurs in the discharging opening R1 of the R head, the Y-direction adjustment mechanism 327 in FIG. 21 is used to move the R head in the Y direction to set the spare discharging opening R2 to the position of the discharging opening R1. In this case, the discharging openings R2, R5, R8 (R8 is not shown), . . . are newly used for a coloring operation. This also applies to the G and B heads.

FIG. 23 shows a case wherein a glass substrate is colored by using the arrangement shown in FIG. 22. Reference numeral 53 denotes a glass substrate; 2, a BM pattern formed on the glass substrate 53; 335, light-transmitting portions; and 331, a colored pattern, which is formed on the glass substrate 53 outside the black matrix 2. In this case, coloring of the pattern 331 is performed as a pre-discharging operation for stabilizing the ink discharged state of a coloring head before a filter is formed by coloring the light-transmitting portions 335 with inks.

FIGS. 24A, 24B, and 24C are views for explaining the positional relationship between a BM pattern and dots pre-discharged onto a blank portion. Referring to FIG. 24A, reference numeral 2 denotes a BM pattern formed on a glass substrate; 335, light-transmitting portions; and 341, dots formed when ink discharged from discharging openings collide with the blank portion. In this case, the dots 341 and the BM pattern 2 are read by the line sensor 319 described with reference to FIG. 21, and the positions of a dot and a light-transmitting portion are respectively obtained as R1(XR1,YR1) and P1(X1,Y1) by the image processing unit 314 in FIG. 20. All the positions of the dots and the light-transmitting portions other than the positions R1 and P1 are also obtained. In the case shown in FIG. 24A, there is no offset between the landing position of the dot 341 and the position of the corresponding light-transmitting portion, and hence no problem is posed when an ink is discharged onto the light-transmitting portion without any adjustment.

FIG. 24B shows a case wherein the landing positions of the red (R) ink of the pre-discharged ink are offset from the normal positions. Referring to FIG. 24B, when calculated position coordinate values R1(XR1,YR1) and P1(X1,Y1) are compared with each other, it is found that the position of a pre-discharged dot R1 is offset from the position of a light-transmitting portion R1' by d in the Y direction. If a filter is formed in this state, an ink droplet mishits the light-transmitting portion. As a result, ink are not uniformly discharged onto light-transmitting portions, posing a problem in terms of the performance of the filter. When such a phenomenon is detected in a pre-discharging stage, it suffices if the Y-direction adjustment mechanism 327 in FIG. 21 is used to move the ink-jet head 305 by the offset amount.

FIG. 24C shows a case wherein when inks are pre-discharged, only a red (R) ink is not discharged. Referring to FIG. 24C, reference numeral 343 denotes a state wherein a dot R1 which should be discharged is not discharged; and 344, a position R2 of a dot discharged from a spare nozzle which is not used for the formation of a filter in a normal state. When such a phenomenon is detected, it suffices if the Y-direction adjustment mechanism 327 in FIG. 21 is used to move the ink-jet head by an offset amount d2 in the Y direction, and the spare nozzles R2 and R5 are used instead of the nozzles R1 and R4.

Only the case of the R ink has been described above. However, this also applies to the G and B inks.

Such correction of the position of each head is indispensable for a case wherein a plurality of ink-jet heads are arranged in a row to shorten the time required for manufacturing a filter, or ink-jet heads of a plurality of colors are used. When only one head is to be used, an offset amount can be absorbed by using the moving mechanism 301 in FIG. 19. When, however, a plurality of heads are to be used, the respective heads may exhibit different offset amounts, and discharge failures do not necessarily occur at the same nozzle position. The posture/position of each head must be adjusted.

Figure 25:
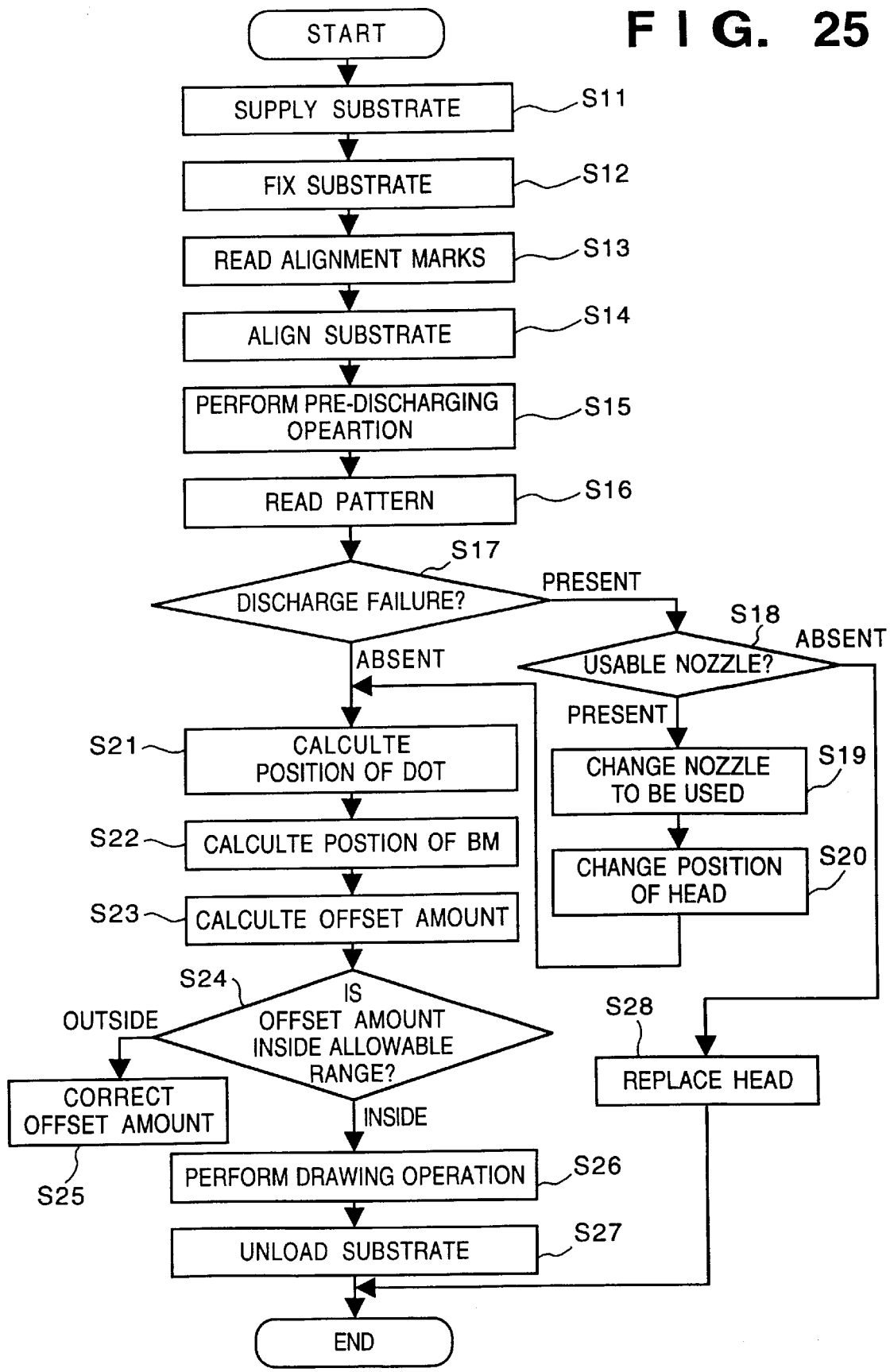
FIG. 25 is a flow chart showing the operation of the color filter manufacturing apparatus.

FIG. 25 is a flow chart showing the operation of the color filter manufacturing apparatus. In step S11, a substrate to be colored by the color filter manufacturing apparatus is supplied onto the base 303 in FIG. 19. In step S12, the supplied substrate is fixed by a suction means such as a vacuum means. In step S13, the alignment marks 310 formed on the substrate are read by the sensors 308 and 309. The position of the substrate is calculated from the read alignment marks. In step S14, the substrate is aligned by using the moving mechanisms 301 and 302 in FIG. 19. When the alignment of the substrate is completed, a pre-discharging operation is performed in step S15. The pre-discharging operation is performed with respect to a blank portion of the glass substrate to be colored. This pre-discharging operation is performed before coloring of pixels to always stabilize a discharging operation. Even if a discharge failure occurs or the landing position of an ink droplet is offset from the normal position, such an abnormality can be detected before a coloring operation, thereby suppressing the occurrence of defective products. In step S16, the colored pre-discharging pattern and the BM pattern are read by the sensor 306. In step S17, a discharge failure is checked on the basis of the read pre-discharging pattern. More specifically, this check is conducted by processing image data indicating whether an ink droplet from a nozzle used for a coloring operation lands, as a dot, on the glass substrate and is present thereon. If a discharge failure is detected in a nozzle to be used, it is checked in step S18 whether any of the nozzles other than the nozzles which should be used in a normal operation can be used. If NO in step S18, the nozzle is replaced with a new one in step S28. If YES in step S18, the nozzle to be used is changed. In step S20, the position of the head is moved by the adjustment mechanisms such that the position of the new nozzle comes to the position of the nozzle which has been used so far.

If it is determined in step S17 that there is no discharge failure, the position of the dot in the pre-discharging pattern and the position of a corresponding portion of the BM pattern are calculated from the read image data in steps S21 and S22. In step S23, the offset amount between the position of the dot and the position of the corresponding portion of the BM pattern is calculated. If it is determined in step S24 that the offset amount calculated in step S23 falls outside an allowable range, and will cause a trouble in coloring of pixels, the offset amount is corrected in step S25. If it is determined in step S24 that the offset amount calculated in step S23 falls within the allowable range, no correction is required. At this time, the apparatus is ready to manufacture a filter. In step S26, therefore, coloring of the pixels is performed to form a filter on the glass substrate. When the filter is completed, the glass substrate is discharged in step S27, thus completing one cycle of the formation of filters.

As described above, according to the above embodiments, by pre-discharging inks onto an area outside the effective pixel area of a glass substrate, the stability of an ink discharging operation can be improved. In addition, the offset between each ink-jet head and a pixel can be corrected.

Various changes and modifications of the above embodiments can be made within the spirit and scope of the invention.

For example, the pattern shown in FIG. 12 is used to check whether inks are properly discharged from the heads. However, other patterns can be used as long as the presence/absence of a discharge failure can be checked. In this case, an area sensor camera is preferably used if the camera is suitable for a checking operation depending on a pattern to be used.

Figure 10:
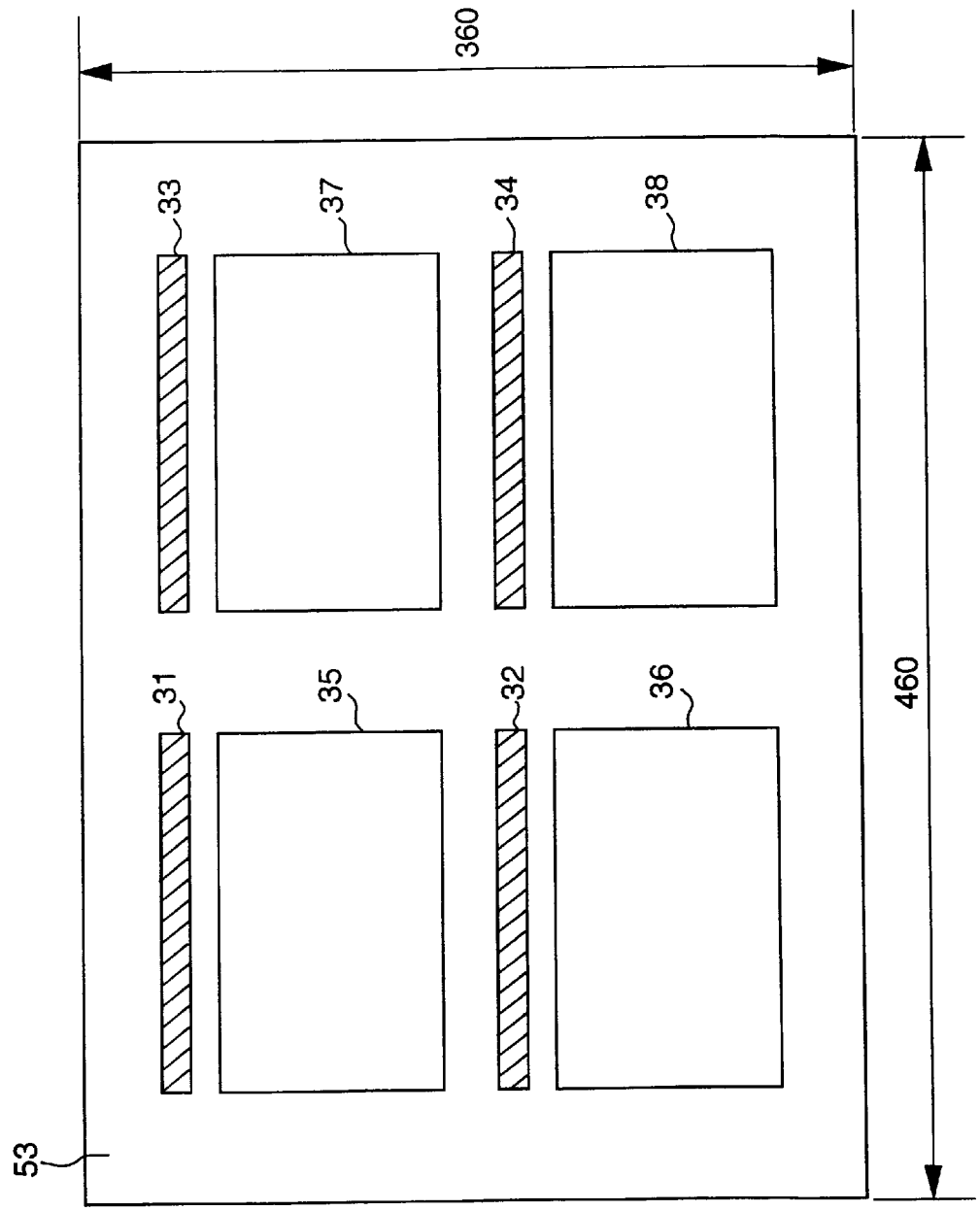
FIG. 10 is a view showing the positional relationship between each head abnormality detection pattern drawing area and each color filter formation area in manufacturing a color filter.

It is most preferable that head abnormality detection pattern coloring areas be set at the positions in FIG. 10. Even if, however, such areas are set at other positions on the substrate or set as dedicated areas outside the substrate, the same effect as described above, i.e., minimizing the occurrence of defective products, can be obtained.

In the above embodiments, the X-Y-θ stage is moved while the ink-jet heads and the line sensor camera are fixed. However, the ink-jet heads and the line sensor camera may be moved while the X-Y-θ stage is fixed.

Furthermore, in the above embodiments, detection of an abnormality such as a discharge failure in an ink-jet head is performed by using the TV camera and the image processing apparatus. However, the present invention is not limited to this. For example, such detection may be performed by detecting interference fringes produced when a laser beam passes through an ink. Alternatively, the reflectance or transmittance of a colored head abnormality detection pattern may be detected.

According to the above description, the present invention is applied to the print apparatus of the system, among various ink-jet recording systems, which has a means (e.g., an electrothermal converter or laser light) for generating heat energy as energy used to discharge an ink, and changes the state of an ink by using the heat energy. According to this system, a high-density, high-definition recording operation can be realized.

As for the typical structure and principle, it is preferable that the basic structure disclosed in, for example, U.S. Pat. No. 4,723,129 or 4,740,796 is employed. The above method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electrothermal converter disposed to face a sheet or a fluid passage which holds the fluid (ink) to a level higher than levels at which film boiling takes place are applied to the electrothermal converter in accordance with recording information so as to generate heat energy in the electrothermal converter and to cause the heat effecting surface of the recording head to take place film boiling so that bubbles can be formed in the fluid (ink) to correspond to the one or more drive signals. The enlargement/contraction of the bubble will cause the fluid (ink) to be discharged through a discharging opening so that one or more droplets are formed. If a pulse shape drive signal is employed, the bubble can be enlarged/contracted immediately and properly, causing a further preferred effect to be obtained because the fluid (ink) can be discharged while revealing excellent responsibility.

It is preferable that a pulse drive signal disclosed in U.S. Pat. No. 4,463,359 or 4,345,262 is employed. If conditions disclosed in U.S. Pat. No. 4,313,124 which is an invention relating to the temperature rising ratio at the heat effecting surface are employed, a satisfactory recording result can be obtained.

As an alternative to the structure (linear fluid passage or perpendicular fluid passage) of the recording head disclosed in each of the above inventions and having an arrangement that discharge ports, fluid passages and electrothermal converters are combined, a structure having an arrangement that the heat effecting surface is disposed in a bent region and disclosed in U.S. Pat. No. 4,558,333 or 4,459,600 may be employed. In addition, the following structures may be employed: a structure having an arrangement that a common slit is formed to serve as a discharge section of a plurality of electrothermal converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

Furthermore, as a recording head of the full line type having a length corresponding to the maximum width of a recording medium which can be recorded by the recording apparatus, either the construction which satisfies its length by a combination of a plurality of recording heads as disclosed in the above specifications or the construction as a single full line type recording head which has integrally been formed can be used.

In addition, the invention is effective for a recording head of the freely exchangeable chip type which enables electrical connection to the recording apparatus main body or supply of ink from the main device by being mounted onto the apparatus main body, or for the case by use of a recording head of the cartridge type provided integrally on the recording head itself.

It is preferred to additionally employ the recording head restoring means and the auxiliary means provided as the component of the present invention because the effect of the present invention can be further stabled. Specifically, it is preferable to employ a recording head capping means, a cleaning means, a pressurizing or suction means, an electrothermal converter, an another heating element or a subheating means constituted by combining them and a subemitting mode in which an emitting is performed independently from the recording emitting in order to stably perform the recording operation.

Although a fluid ink is employed in the above embodiments of the present invention, an ink which is solidified at the room temperature or lower, or an ink which is softened or liquified at the room temperature may be used. That is, any ink which is liquified when a recording signal is supplied may be used.

Furthermore, an ink which is solidified when it is caused to stand, and liquified when heat energy is supplied in accordance with a recording signal can be adapted to the present invention to positively prevent a temperature rise caused by heat energy by utilizing the temperature rise as energy of state transition from the solid state to the liquid state or to prevent ink evaporation. In any case, an ink which is liquified when heat energy is supplied in accordance with a recording signal so as to be discharged in the form of fluid ink, or an ink which is liquified only after heat energy is supplied, e.g., an ink which starts to solidify when it reaches a recording medium, can be adapted to the present invention. In the above case, the ink may be of a type which is held as fluid or solid material in a recess of a porous sheet or a through hole at a position to face the electrothermal converter as disclosed in Japanese Patent Laid-Open No. 54-56847 or Japanese Patent Laid-Open No. 60-71260. It is the most preferred way for the ink to be adapted to the above film boiling method.

As has been described above, according to the present invention, in forming a plurality of color filters on one substrate, detection of a discharge failure in each ink-jet head is performed immediately before coloring of each color filter as well as in an initial period of a coloring process, thereby preventing the manufacture of many defective color filters and improving the yield of color filters.

In addition, since the step of performing a discharging operation for detection of a head abnormality is present in a coloring sequence for each color filter, the color filter productivity can be improved.

Furthermore, the coloring operation of the ink-jet system can be stabilized by performing a pre-discharging operation with respect to a substrate before coloring of the pixels of a color filter.

The present invention is not limited to the above embodiments and various changes and modifications can be made within the spirit and scope of the present invention. Therefore, to apprise the public of the scope of the present invention the following claims are made.

What is claimed is:

1. A method comprising the steps of:

detecting a discharge failure in an ink-jet head before coloring a coloring area to serve as a color filter, wherein the coloring is effected for each pixel by using the ink-jet head to discharge ink onto a substrate, wherein the coloring area effects color filtering and includes a color pattern for color filtering formed by ink discharged thereon, and wherein said detecting step is performed by detecting ink discharged on an area, not used to effect color filtering, that is outside of and on a same substrate as the coloring area.

2. A method comprising the steps of:

in forming the plurality of color filters on one substrate, detecting a discharge failure in an ink-jet head before coloring a coloring area of each color filter, wherein the coloring is effected for each pixel by using the ink-jet head to discharge ink onto the substrate, wherein the coloring area effects color filtering and includes a color pattern for color filtering formed by ink discharged thereon, and wherein said detecting step is performed by detecting ink discharged on an area, not used to effect color filtering, that is outside of and on a same substrate as the coloring area.

3. The method according to claim 2, wherein the detection of a discharge failure in the ink-jet head is performed on the substrate at a position outside a formation area of each of the color filters.

4. The method according to claim 2, wherein the detection of a discharge failure in the ink-jet head is performed in a continuous coloring sequence for each of the color filters.

5. The method according to claim 2, wherein the detection of a discharge failure in the ink-jet head is performed by detecting a reflectance of a colored portion formed by discharging an ink.

6. The method according to claim 2, wherein the detection of a discharge failure in the ink-jet head is performed by detecting a transmittance of a colored portion formed by discharging an ink.

7. The method according to claim 2, wherein the ink-jet head is a head for discharging an ink by using heat energy, the head having a heat energy generator for generating heat energy applied to the ink.

8. An apparatus comprising:

an ink-jet head;

a stage for moving the substrate relative to said ink-jet head; and detection means for, in forming a plurality of color filters on one substrate, detecting a discharge failure in said ink-jet head before coloring a coloring area of each color filter, wherein the coloring is effected by using said ink-jet head to discharge ink onto the substrate, wherein the coloring area effects color filtering and includes a color pattern for color filtering formed by ink discharged thereon, and wherein said detection means detects the discharge failure by detecting ink discharged on an area, not used to effect color filtering, that is outside of and on a same substrate as the coloring area.

9. The apparatus according to claim 8, wherein said ink-jet head is a head for discharging an ink by using heat energy, said head having a heat energy generator for generating heat energy applied to the ink.

10. A color filter comprising:

a coloring area which effects color filtering and includes a color pattern for color filtering formed by ink discharged thereon by an ink-jet head, wherein a discharge failure in the ink-jet head is detected by detecting ink discharged on an area, not used to effect color filtering, that is outside of and on a same substrate as the coloring area.

11. A color filter substrate comprising:

a coloring area which effects color filtering and includes a color pattern for color filtering formed by ink discharged thereon by an ink-jet head, wherein a discharge failure in the ink-jet head is detected by detecting ink discharged on an area, not used to effect color filtering, that is outside of and on a same substrate as the coloring area between coloring areas of a plurality of color filters formed on said same substrate.

12. A display device comprising:

a color filter having a coloring area which effects color filtering and includes a color pattern for color filtering formed by ink discharged thereon by an ink-jet head, wherein a discharge failure in the ink-jet head is detected by detecting ink discharged on an area, not used to effect color filtering, that is outside of and on a same substrate as the coloring area; and light amount changing means for changing a light amount.

13. An apparatus comprising:

(a) a display device integrally including (1) a color filter having a coloring area which effects color filtering and includes a color pattern for color filtering formed by ink discharged thereon by an ink-jet head, wherein a discharge failure in the ink-jet head is detected by detecting ink discharged on an area, not used to effect color filtering, that is outside of and on a same substrate as the coloring area, and (2) light amount changing means for changing a light amount; and (b) image signal supply means for supplying an image signal to said display device.

14. A method comprising the steps of:

providing a substrate; and performing a pre-discharging operation of an ink-jet head onto a same substrate at a step which is previous to and which successively proceeds to a step of coloring a coloring area to serve as a color filter, wherein said coloring is effected by using the ink-jet head to discharge an ink onto the substrate, wherein the coloring area effects color filtering and includes a color pattern for color filtering formed by ink discharged thereon, and wherein said pre-discharging operation is performed by discharging inks on an area, not used to effect color filtering, that is outside of and on a same substrate as the coloring area.

15. The method according to claim 14, wherein the ink-jet head comprises a nozzle used for a coloring operation, and a spare nozzle used when a discharge failure occurs in the nozzle used for a coloring operation, and said pre-discharging operation is performed by discharging the ink from the nozzle used for a coloring operation and the spare nozzle.

16. The method according to claim 14, wherein said discharging operation is performed by discharging the ink onto an ink-receiving layer formed on the substrate to absorb the ink.

17. The method according to claim 14, further comprising detecting a landing position of the ink discharged in said pre-discharging position, and a position of the coloring area of the color filter, and adjusting a position of the ink-jet head when there is an offset between the detected position.

18. The method according to claim 14, wherein said pre-discharging operation is performed by discharging the ink onto a portion on the substrate on which an ink-receiving layer for absorbing the ink is not formed, and the ink discharged in said pre-discharging operation is washed off from said substrate afterward.

19. The method according to claim 14, wherein said pre-discharging operation is performed with respect to two sides of the effective coloring area of the color filter.

20. An apparatus comprising:

an ink-jet head;

a stage for moving the substrate relative to said ink-jet head; and control means for controlling said ink-jet head and said stage to perform a pre-discharging operation of said ink-jet head with respect to the substrate before coloring of a coloring area to serve as a color filter, wherein the coloring is effected by using said ink-jet head to discharge an ink onto the substrate, wherein the coloring area effects color filtering and includes a color pattern for color filtering formed by ink discharged thereon, and wherein the pre-discharging operation is performed on an area, not used to effect color filtering, that is outside of and on a same substrate as the coloring area.

21. The apparatus according to claim 20, further comprising detection means for detecting a landing position of the ink discharged in the pre-discharging operation, and a position of the coloring area of the color filter, and wherein said control means adjusts a position of said ink-jet head when there is an offset between the landing position of the ink and the position of the coloring area.

22. The apparatus according to claim 20, wherein said control means performs control to perform the pre-discharging operation with respect to two sides of the coloring area of the color filter.

23. A color filter comprising:

a coloring area which effects color filtering and includes a color pattern for color filtering formed by ink discharged thereon by an ink-jet head, wherein a pre-discharging operation of the ink-jet head is performed by discharging inks on an area, not used to effect color filtering, that is outside of and on a same substrate as the coloring area.

24. A display device comprising:

a color filter having a coloring area which effects color filtering and includes a color pattern for color filtering formed by ink discharged thereon by an ink-jet head; and light amount changing means for changing a light amount, wherein the pre-discharging operation is performed by discharging ink on an area, not used to effect color filtering, that is outside of and on a same substrate as the coloring area.

25. An apparatus comprising:

(a) a display device integrally including (1) a color filter having a coloring area which effects color filtering and includes a color Pattern for color filtering formed by ink discharged thereon by an ink-jet head, and (2) light amount changing means for changing a light amount; and (b) image signal supply means for supplying an image signal to said display device, wherein a pre-discharging operation is performed by discharging inks on an area, not used to effect color filtering, that is outside of and on a same substrate as the coloring area.

26. A method comprising the steps of:

a pre-discharging step of pre-discharging ink from an ink-jet head onto an area, not used to effect color filtering, that is outside of and on a same substrate as a coloring area, wherein the coloring area effects color filtering and includes a color pattern for color filtering formed by ink discharged thereon by the ink-jet head;

a detection step of detecting the presence/absence of a coloring failure according to a coloring result in said pre-discharging step; and a position adjustment step of adjusting a position of the ink-jet head to move each ink discharging nozzle to a position corresponding to the coloring area when a coloring failure is detected in said detection step.

27. The method according to claim 26, wherein the plurality of ink discharging nozzles comprise a nozzle to be used and a spare nozzle, and when the coloring failure is a discharge failure, the spare nozzle is moved to a position corresponding to the coloring area in said position adjustment step so as to discharging the ink by using the spare nozzle instead of the nozzle to be used.

28. The method according to claim 26, wherein when the coloring failure is a discharging position offset, said nozzle to be used is moved to a position corresponding to the effective coloring area in the position adjustment step.

29. An apparatus comprising:

an ink-jet head having a plurality of ink discharging nozzles;

detection means for detecting a coloring failure by detecting an ink dot formed by pre-discharging the ink from said ink-jet head onto an area, not used to effect color filtering, that is outside of and on a same substrate as the coloring area, wherein the coloring area effects color filtering and includes a color pattern for color filtering formed by ink discharged thereon by said ink-jet head; and position adjustment means for adjusting a position of an ink-jet head to move each ink discharging nozzle to a position corresponding to the coloring area when a coloring failure is detected by said detection means.

30. The apparatus according to claim 29, wherein said plurality of ink discharging nozzles comprise a nozzle to be used and a spare nozzle, and when the coloring failure is a discharge failure, said spare nozzle is moved to a position corresponding to the effective coloring area by said position adjustment means so as to discharge the ink by using said spare nozzle instead of said nozzle to be used.

31. The apparatus according to claim 29, wherein when the coloring failure is a discharging position offset, a nozzle to be used is moved to a position corresponding to the coloring area by said position adjustment means.

32. A color filter manufacturing method comprising the steps of:

providing a substrate; and performing a pre-discharging operation of an ink-jet head onto a same substrate at a step which is previous to and which successively proceeds to a step of coloring an effective coloring area of the color filter using the ink-jet head, wherein said pre-discharging operation is performed by discharging inks at an area, outside of the effective color area, which is on a same substrate as the substrate on which the effective coloring area exists, and wherein the effective coloring area is comprised of arranged coloring rows, and starting positions of said pre-discharging operation are changed for each of the color rows with respect to a direction of arranging the arranged coloring rows.

33. A color filter manufacturing method comprising the steps of:

providing a substrate; and performing a pre-discharging operation of an ink-jet head onto a same substrate at a step which is previous to and which successively proceeds to a step of coloring the effective coloring area of the color filter using the ink-jet head, wherein said pre-discharging operation is performed by discharging inks at an area, outside of the effective coloring area, which is on a same substrate as the substrate on which the effective coloring area exists, and wherein the effective coloring area is comprised of arranged coloring rows, and discharge density is reduced at a vicinity of a starting position of said pre-discharging operation as compared to the discharge density of the effective coloring area.

34. A color filter comprising:

a first coloring area which effects color filtering of plural colors and includes a plurality of first color patterns for color filtering, each of said first color pattern corresponding to each of the plural colors; and a second coloring area, not used to effect color filtering, that is outside of a same substrate as the first coloring area, wherein the second coloring area has a plurality of second color patterns, each of which has a one-to-one correspondence with each of the first color pattern.

* * * * *

UNITED STATES PATENT AND TRADEMARK OFFICE
CERTIFICATE OF CORRECTION

PATENT NO.   : 6,145,981
DATED        : November 14, 2000
INVENTOR(S)  : Makoto Akahira, et al.

It is certified that error appears in the above-identified patent and that said Letters Patent is hereby corrected as shown below:

Title page, Item [56], References Cited,
Foreign Patent Documents, "59-1223670" should read -- 59-123670 --; and
U.S. Patent Documents, the following should be inserted:
--     5,714,195     3/1998     Shiba et al.      427/140
       5,276,459     4/1994     Danzuke et al.    346/33          --.

Drawings, Sheet 29,
Figure 25, "CALCULTE" (all occurrences) should read -- CALCULATE --.

Column 4,
Line 42, "a preferred embodiment" should read -- preferred embodiments --.

Column 11,
Line 63, "tens" should read -- tens of --.

Column 17,
Line 57, "are" should read -- is --.

Column 20,
Line 47, "an" should be deleted; and
Line 49, "an" should be deleted.

Column 22,
Line 56, there should be a paragraph after "and".

Column 24,
Line 26, "Pattern" should read -- pattern --; and
Line 55, "discharging" should read -- discharge --.

UNITED STATES PATENT AND TRADEMARK OFFICE
CERTIFICATE OF CORRECTION

PATENT NO.    : 6,145,981
DATED         : November 14, 2000
INVENTOR(S)   : Makoto Akahira, et al.

It is certified that error appears in the above-identified patent and that said Letters Patent is hereby corrected as shown below:

<u>Column 26,</u>
Line 25, "pattern" should read -- patterns --; and
Line 32, "pattern" should read -- patterns --.

Signed and Sealed this

Sixth Day of November, 2001

*Attest:*

Nicholas P. Godici

NICHOLAS P. GODICI
*Attesting Officer*   *Acting Director of the United States Patent and Trademark Office*